(12) United States Patent
Holland et al.

(10) Patent No.: US 9,402,294 B2
(45) Date of Patent: Jul. 26, 2016

(54) SELF-CALIBRATING MULTI-DIRECTIONAL SECURITY LUMINAIRE AND ASSOCIATED METHODS

(71) Applicant: LIGHTING SCIENCE GROUP CORPPORATION, Satellite Beach, FL (US)

(72) Inventors: Eric Holland, Indian Harbour Beach, FL (US); Julia Sharon Irvin, Melbourne, FL (US); Eric Thosteson, Satellite Beach, FL (US); Benjamin Charles Burns, Satellite Beach, FL (US); John Beck, Satellite Beach, FL (US)

(73) Assignee: Lighting Science Group Corporation, Melbourne, FL (US)

( * ) Notice: Subject to any disclaimer, the term of this patent is extended or adjusted under 35 U.S.C. 154(b) by 347 days.

(21) Appl. No.: 13/842,875

(22) Filed: Mar. 15, 2013

(65) Prior Publication Data

US 2013/0300290 A1 Nov. 14, 2013

Related U.S. Application Data

(60) Provisional application No. 61/644,152, filed on May 8, 2012.

(51) Int. Cl.
*F21V 23/04* (2006.01)
*H05B 37/02* (2006.01)
(Continued)

(52) U.S. Cl.
CPC ............. *H05B 37/0218* (2013.01); *F21S 8/036* (2013.01); *F21V 23/0478* (2013.01); *G08B 13/19663* (2013.01)

(58) Field of Classification Search
CPC ........... H05B 37/0218; H05B 37/0227; H05B 37/0236; H05B 37/0245; H05B 37/0254; F21V 23/0478; F21V 23/0471; F21S 8/036; F21S 8/03; F21S 8/037; G08B 13/19663
See application file for complete search history.

(56) References Cited

U.S. PATENT DOCUMENTS

| 4,551,654 A | 11/1985 | Barnum et al. |
| 4,668,940 A | 5/1987 | Beard |

(Continued)

FOREIGN PATENT DOCUMENTS

| CN | 101702421 A | 5/2010 |
| EP | 0851260 | 7/1998 |

(Continued)

OTHER PUBLICATIONS

US 4,970,436, 11/1990, Sacchetti (withdrawn).

(Continued)

*Primary Examiner* — Jung Kim
(74) *Attorney, Agent, or Firm* — Mark Malek; Kelly Swartz; Widerman Malek, PL

(57) ABSTRACT

A luminaire may include a wall mount and a driver circuit housing connected to the wall mount. The luminaire may also include a camera housing connected to the driver circuit housing, a light source housing connected to the camera housing, and a light source array that includes a plurality of light sources carried by the light source housing. The luminaire may include a prism, a heat sink in thermal communication with the light source array, and a camera carried by the camera housing. The luminaire may also include a sensor and a driver circuit carried by the driver circuit housing. The camera and/or the sensor may be configured to detect the presence and vicinity of an object in the target area. The light sources may be configured to emit light to illuminate the vicinity of the object sensed in the target area.

19 Claims, 14 Drawing Sheets

(51) Int. Cl.
*F21S 8/00* (2006.01)
*G08B 13/196* (2006.01)

(56) References Cited

U.S. PATENT DOCUMENTS

| | | |
|---|---|---|
| 4,942,384 A | 7/1990 | Yamauchi et al. |
| 5,319,301 A | 6/1994 | Callahan et al. |
| 5,523,878 A | 6/1996 | Wallace et al. |
| 5,563,422 A | 10/1996 | Nakamura et al. |
| 5,680,230 A | 10/1997 | Kaburagi et al. |
| 5,704,701 A | 1/1998 | Kavanagh et al. |
| 5,747,976 A | 5/1998 | Wong et al. |
| 5,813,753 A | 9/1998 | Vriens et al. |
| 5,936,599 A | 8/1999 | Reymond et al. |
| 5,997,150 A | 12/1999 | Anderson |
| 6,140,646 A | 10/2000 | Busta et al. |
| 6,259,572 B1 | 7/2001 | Meyer, Jr. |
| 6,272,154 B1 | 8/2001 | Bala et al. |
| 6,341,876 B1 | 1/2002 | Moss et al. |
| 6,356,700 B1 | 3/2002 | Strobl |
| 6,450,652 B1 | 9/2002 | Karpen |
| 6,459,919 B1 | 10/2002 | Lys et al. |
| 6,528,954 B1 | 3/2003 | Lys et al. |
| 6,561,656 B1 | 5/2003 | Kojima et al. |
| 6,577,080 B2 | 6/2003 | Lys et al. |
| 6,586,882 B1 | 7/2003 | Harbers |
| 6,594,090 B2 | 7/2003 | Kruschwitz et al. |
| 6,733,135 B2 | 5/2004 | Dho |
| 6,734,639 B2 | 5/2004 | Chang et al. |
| 6,762,562 B2 | 7/2004 | Leong |
| 6,767,111 B1 | 7/2004 | Lai |
| 6,817,735 B2 | 11/2004 | Shimizu et al. |
| 6,853,150 B2 | 2/2005 | Clauberg et al. |
| 6,870,523 B1 | 3/2005 | Ben-David et al. |
| 6,871,982 B2 | 3/2005 | Holman et al. |
| 6,876,007 B2 | 4/2005 | Yamazaki et al. |
| 6,967,761 B2 | 11/2005 | Starkweather et al. |
| 6,974,713 B2 | 12/2005 | Patel et al. |
| 7,034,934 B2 | 4/2006 | Manning |
| 7,042,623 B1 | 5/2006 | Huibers et al. |
| 7,058,197 B1 | 6/2006 | McGuire et al. |
| 7,066,628 B2 | 6/2006 | Allen |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads |
| 7,095,053 B2 | 8/2006 | Mazzochette et al. |
| 7,138,770 B2 | 11/2006 | Uang et al. |
| 7,144,131 B2 | 12/2006 | Rains |
| 7,157,745 B2 | 1/2007 | Blonder et al. |
| 7,178,941 B2 | 2/2007 | Roberge et al. |
| 7,184,201 B2 | 2/2007 | Duncan |
| 7,187,484 B2 | 3/2007 | Mehrl |
| 7,213,926 B2 | 5/2007 | May et al. |
| 7,234,844 B2 | 6/2007 | Bolta et al. |
| 7,246,923 B2 | 7/2007 | Conner |
| 7,247,874 B2 | 7/2007 | Bode et al. |
| 7,252,408 B2 | 8/2007 | Mazzochette et al. |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,319,293 B2 | 1/2008 | Maxik |
| 7,324,076 B2 | 1/2008 | Lee et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,349,095 B2 | 3/2008 | Kurosaki |
| 7,353,859 B2 | 4/2008 | Stevanovic et al. |
| 7,369,056 B2 | 5/2008 | McCollough et al. |
| 7,382,091 B2 | 6/2008 | Chen |
| 7,382,632 B2 | 6/2008 | Alo et al. |
| 7,400,439 B2 | 7/2008 | Holman |
| 7,427,146 B2 | 9/2008 | Conner |
| 7,429,983 B2 | 9/2008 | Islam |
| 7,434,946 B2 | 10/2008 | Huibers |
| 7,436,996 B2 | 10/2008 | Ben-Chorin |
| 7,438,443 B2 | 10/2008 | Tatsuno et al. |
| 7,476,016 B2 | 1/2009 | Kurihara |
| 7,489,086 B2 | 2/2009 | Miskin |
| 7,497,596 B2 | 3/2009 | Ge |
| 7,520,607 B2 | 4/2009 | Casper et al. |
| 7,520,642 B2 | 4/2009 | Holman et al. |
| 7,521,875 B2 | 4/2009 | Maxik |
| 7,528,421 B2 | 5/2009 | Mazzochette |
| 7,530,708 B2 | 5/2009 | Park |
| 7,537,347 B2 | 5/2009 | Dewald |
| 7,540,616 B2 | 6/2009 | Conner |
| 7,556,376 B2 | 7/2009 | Ishak et al. |
| 7,556,406 B2 | 7/2009 | Petroski et al. |
| 7,567,040 B2 | 7/2009 | Pong et al. |
| 7,573,210 B2 | 8/2009 | Ashdown et al. |
| 7,598,682 B2 | 10/2009 | Grajcar |
| 7,598,686 B2 | 10/2009 | Lys et al. |
| 7,598,961 B2 | 10/2009 | Higgins |
| 7,605,971 B2 | 10/2009 | Ishii et al. |
| 7,619,372 B2 | 11/2009 | Garrity |
| 7,626,755 B2 | 12/2009 | Furuya et al. |
| 7,633,093 B2 | 12/2009 | Blonder et al. |
| 7,633,779 B2 | 12/2009 | Garrity et al. |
| 7,637,643 B2 | 12/2009 | Maxik |
| 7,677,736 B2 | 3/2010 | Kasazumi et al. |
| 7,678,140 B2 | 3/2010 | Brainard et al. |
| 7,679,281 B2 | 3/2010 | Kim et al. |
| 7,684,007 B2 | 3/2010 | Hull et al. |
| 7,703,943 B2 | 4/2010 | Li et al. |
| 7,705,810 B2 | 4/2010 | Choi et al. |
| 7,708,452 B2 | 5/2010 | Maxik et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,748,845 B2 | 7/2010 | Casper et al. |
| 7,766,490 B2 | 8/2010 | Harbers et al. |
| 7,819,556 B2 | 10/2010 | Heffington et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Grueber |
| 7,845,823 B2 | 12/2010 | Mueller et al. |
| 7,852,017 B1 | 12/2010 | Melanson |
| 7,855,376 B2 | 12/2010 | Cantin et al. |
| 7,871,839 B2 | 1/2011 | Lee |
| 7,880,400 B2 | 2/2011 | Zhoo et al. |
| 7,889,430 B2 | 2/2011 | El-Ghoroury et al. |
| 7,902,769 B2 | 3/2011 | Shteynberg et al. |
| 7,906,789 B2 | 3/2011 | Jung et al. |
| 7,928,565 B2 | 4/2011 | Brunschwiler et al. |
| 7,972,030 B2 | 7/2011 | Li |
| 7,976,182 B2 | 7/2011 | Ribarich |
| 7,976,205 B2 | 7/2011 | Grotsch et al. |
| 8,016,443 B2 | 9/2011 | Falicoff et al. |
| 8,022,634 B2 | 9/2011 | Greenfeld |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,083,364 B2 | 12/2011 | Allen |
| 8,096,668 B2 | 1/2012 | Abu-Ageel |
| 8,115,419 B2 | 2/2012 | Given et al. |
| 8,164,844 B2 | 4/2012 | Toda et al. |
| 8,182,106 B2 | 5/2012 | Shin |
| 8,182,115 B2 | 5/2012 | Takahashi et al. |
| 8,188,687 B2 | 5/2012 | Lee et al. |
| 8,192,047 B2 | 6/2012 | Bailey et al. |
| 8,207,676 B2 | 6/2012 | Hilgers |
| 8,212,494 B2 | 7/2012 | Veltman et al. |
| 8,212,836 B2 | 7/2012 | Matsumoto et al. |
| 8,253,336 B2 | 8/2012 | Maxik et al. |

(56) References Cited

U.S. PATENT DOCUMENTS

| | | | |
|---|---|---|---|
| 8,256,921 B2 | 9/2012 | Crookham et al. |
| 8,274,089 B2 | 9/2012 | Lee |
| 8,297,783 B2 | 10/2012 | Kim |
| 8,304,978 B2 | 11/2012 | Kim et al. |
| 8,310,171 B2 | 11/2012 | Reisenauer et al. |
| 8,319,445 B2 | 11/2012 | McKinney et al. |
| 8,324,574 B2 * | 12/2012 | Own et al. | 250/311 |
| 8,324,808 B2 | 12/2012 | Maxik et al. |
| 8,324,823 B2 | 12/2012 | Choi et al. |
| 8,324,840 B2 | 12/2012 | Shteynberg et al. |
| 8,331,099 B2 | 12/2012 | Geissler et al. |
| 8,337,029 B2 | 12/2012 | Li |
| 8,378,574 B2 | 2/2013 | Schlangen et al. |
| 8,401,231 B2 | 3/2013 | Maxik et al. |
| 8,410,717 B2 | 4/2013 | Shteynberg et al. |
| 2002/0113555 A1 | 8/2002 | Lys et al. |
| 2004/0052076 A1 | 3/2004 | Mueller et al. |
| 2004/0093045 A1 | 5/2004 | Bolta |
| 2004/0119086 A1 | 6/2004 | Yano et al. |
| 2005/0189557 A1 | 9/2005 | Mazzochette et al. |
| 2005/0218780 A1 | 10/2005 | Chen |
| 2005/0267213 A1 | 12/2005 | Gold et al. |
| 2006/0002108 A1 | 1/2006 | Ouderkirk et al. |
| 2006/0002110 A1 | 1/2006 | Dowling et al. |
| 2006/0164005 A1 | 7/2006 | Sun |
| 2006/0232992 A1 | 10/2006 | Bertram et al. |
| 2006/0285193 A1 | 12/2006 | Kimura et al. |
| 2007/0013871 A1 | 1/2007 | Marshall et al. |
| 2007/0152811 A1 | 7/2007 | Anderson |
| 2007/0159492 A1 | 7/2007 | Lo et al. |
| 2007/0188847 A1 | 8/2007 | McDonald et al. |
| 2007/0241340 A1 | 10/2007 | Pan |
| 2007/0262714 A1 | 11/2007 | Bylsma |
| 2008/0119912 A1 | 5/2008 | Hayes |
| 2008/0136356 A1 * | 6/2008 | Zampini et al. | 315/308 |
| 2008/0143973 A1 | 6/2008 | Wu |
| 2008/0198572 A1 | 8/2008 | Medendorp |
| 2008/0232084 A1 | 9/2008 | Kon |
| 2008/0258643 A1 | 10/2008 | Cheng et al. |
| 2009/0009102 A1 | 1/2009 | Kahlman et al. |
| 2009/0059099 A1 | 3/2009 | Linkov et al. |
| 2009/0059585 A1 | 3/2009 | Chen et al. |
| 2009/0128781 A1 | 5/2009 | Li |
| 2009/0160370 A1 | 6/2009 | Tai et al. |
| 2009/0175041 A1 | 7/2009 | Yuen et al. |
| 2009/0200952 A1 | 8/2009 | King et al. |
| 2009/0232683 A1 | 9/2009 | Hirata et al. |
| 2009/0261748 A1 | 10/2009 | McKinney et al. |
| 2009/0262516 A1 | 10/2009 | Li |
| 2009/0273931 A1 | 11/2009 | Ito et al. |
| 2009/0303694 A1 | 12/2009 | Roth et al. |
| 2010/0001652 A1 | 1/2010 | Damsleth |
| 2010/0006762 A1 | 1/2010 | Yoshida et al. |
| 2010/0051976 A1 | 3/2010 | Rooymans |
| 2010/0053959 A1 | 3/2010 | Ijzerman et al. |
| 2010/0060181 A1 | 3/2010 | Choi et al. |
| 2010/0061068 A1 | 3/2010 | Geissler et al. |
| 2010/0061078 A1 | 3/2010 | Kim |
| 2010/0072494 A1 | 3/2010 | Lee |
| 2010/0076250 A1 | 3/2010 | Van Woudenberg |
| 2010/0103389 A1 | 4/2010 | McVea et al. |
| 2010/0157573 A1 | 6/2010 | Toda et al. |
| 2010/0202129 A1 | 8/2010 | Abu-Ageel |
| 2010/0213859 A1 | 8/2010 | Shteynberg et al. |
| 2010/0213861 A1 * | 8/2010 | Kaneda et al. | 315/250 |
| 2010/0231131 A1 | 9/2010 | Anderson |
| 2010/0231136 A1 | 9/2010 | Reisenauer et al. |
| 2010/0231863 A1 | 9/2010 | Hikmet et al. |
| 2010/0244700 A1 | 9/2010 | Chong et al. |
| 2010/0244724 A1 | 9/2010 | Jacobs et al. |
| 2010/0244735 A1 | 9/2010 | Buelow, II |
| 2010/0244740 A1 | 9/2010 | Alpert et al. |
| 2010/0259931 A1 | 10/2010 | Chemel |
| 2010/0270942 A1 | 10/2010 | Hui et al. |
| 2010/0277084 A1 | 11/2010 | Lee et al. |
| 2010/0277097 A1 | 11/2010 | Maxik et al. |
| 2010/0277316 A1 | 11/2010 | Schlangen |
| 2010/0295455 A1 * | 11/2010 | Reed | 315/152 |
| 2010/0302464 A1 | 12/2010 | Raring et al. |
| 2010/0308738 A1 | 12/2010 | Shteynberg et al. |
| 2010/0315320 A1 | 12/2010 | Yoshida |
| 2010/0320927 A1 | 12/2010 | Gray et al. |
| 2010/0320928 A1 | 12/2010 | Kaihotsu et al. |
| 2010/0321641 A1 | 12/2010 | Van Der Lubbe |
| 2010/0321933 A1 | 12/2010 | Hatanaka et al. |
| 2011/0012137 A1 | 1/2011 | Lin et al. |
| 2011/0080635 A1 | 4/2011 | Takeuchi |
| 2011/0156584 A1 * | 6/2011 | Kim | 315/32 |
| 2011/0248640 A1 | 10/2011 | Welten |
| 2011/0309759 A1 | 12/2011 | Shteynberg et al. |
| 2011/0310446 A1 | 12/2011 | Komatsu |
| 2012/0250137 A1 | 10/2012 | Maxik et al. |
| 2012/0262069 A1 | 10/2012 | Reed |
| 2012/0262093 A1 | 10/2012 | Recker |
| 2012/0285667 A1 | 11/2012 | Maxik et al. |
| 2012/0286672 A1 | 11/2012 | Holland et al. |
| 2012/0286673 A1 | 11/2012 | Holland et al. |
| 2012/0286700 A1 | 11/2012 | Maxik et al. |
| 2012/0287245 A1 | 11/2012 | Holland et al. |
| 2012/0287271 A1 | 11/2012 | Holland et al. |
| 2013/0070439 A1 | 3/2013 | Maxik et al. |
| 2013/0320863 A1 * | 12/2013 | Mitchell et al. | 315/153 |
| 2014/0285096 A1 | 9/2014 | Cuppen |

FOREIGN PATENT DOCUMENTS

| | | | |
|---|---|---|---|
| EP | 1671059 B1 | 4/2007 |
| EP | 2292464 A1 | 9/2011 |
| JP | 2008226567 | 9/2008 |
| JP | 2009-283183 * | 3/2009 |
| WO | WO03098977 | 11/2003 |
| WO | WO2004011846 A1 | 2/2004 |
| WO | WO2006001221 A1 | 1/2006 |
| WO | WO2009121539 A1 | 10/2009 |
| WO | WO 2010027459 | 3/2010 |
| WO | WO 2010098811 | 9/2010 |
| WO | WO 2011008251 | 1/2011 |
| WO | WO 2011016860 | 2/2011 |
| WO | WO2012064470 | 5/2012 |
| WO | WO2012135173 | 10/2012 |
| WO | WO2012158665 | 11/2012 |
| WO | PCTUS2012067916 | 12/2012 |

OTHER PUBLICATIONS

US 4,992,701, 02/1991, Sacchetti (withdrawn).

Akashi, Yukio, et al., Assessment of Headlamp Glare and Potential Countermeasures: Survey of Advanced Front Lighting System (AFS), U.S. Department of Transportation, National Highway Traffic Safety Administration, Contract No. DTNH22-99-D-07005, (Dec. 2005).

Arthur P. Fraas, Heat Exchanger Design, 1989, p. 60, John Wiley & Sons, Inc., Canada.

Boeing, International Space Program, S684-13489 Revision A "ISS Interior Solid State Lighting Assembly (SSLA) Specification", Submitted to National Aeronautics and Space Administration, Johnson Space Center, Contract No. NAS15-10000, pp. 1-60, (Jul. 6, 2011).

Brainard, et al., (Aug. 15, 2001), "Action Spectrum for Melatonin Regulation in Humans: Evidence for a Novel Circadian Photoreceptor", The Journal of Neuroscience, 21(16):6405-6412.

Binnie et al. (1979) "Fluorescent Lighting and Epilepsy" Epilepsia 20(6):725-727.

Bullough, John, et al., "Discomfort Glare from Headlamps: Interactions Among Spectrum, Control of Gaze and Background Light Level", Society of Automotive Engineers, Inc., 2003-01-0296, (2003).

Charamisinau et al. (2005) "Semiconductor laser insert with Uniform Illumination for Use in Photodynamic Therapy" Appl Opt 44(24):5055-5068.

Derlofske, et al., "Headlamp Parameters and Glare", Society of Automotive Engineers, Inc., 2004-01-1280, (2004).

(56) References Cited

OTHER PUBLICATIONS

ERBA Shedding Light on Photosensitivity, One of Epilepsy's Most Complex Conditions. Photosensitivity and Epilepsy. Epilepsy Foundation. Accessed: Aug. 28, 2009. http://www.epilepsyfoundation.org/aboutepilepsy/seizures/photosensitivity-/gerba.cfm.

Figueiro et al. (2004) "Spectral Sensitivity of the Circadian System" Proc. SPIE 5187:207.

Figueiro et al. (2008) "Retinal Mechanisms Determine the Subadditive Response to Polychromatic Light by the Human Circadian System" Neurosci Lett 438(2):242.

Gabrecht et al. (2007) "Design of a Light Delivery System for the Photodynamic Treatment of the Crohn's Disease" Proc. SPIE 6632:1-9.

H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.

Happawana et al. (2009) "Direct De-Ionized Water-Cooled Semiconductor Laser Package for Photodynamic Therapy of Esophageal Carcinoma: Design and Analysis" J Electron Pack 131(2):1-7.

Harding & Harding (1999) "Televised Material and Photosensitive Epilepsy" Epilepsia 40(Suppl. 4):65.

Hickcox, Sweater K., et al., Lighting Research Center, "Effect of different colored background lighting on LED discomfort glare perception", Proc. of SPIE, vol. 8484, 84840O-1, (2012).

Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.

J. Y. San, C. H. Huang, M. H, Shu, "Impingement cooling of a confined circular air jet", in t. J. Heat Mass Transf., 1997. pp. 1355-1364, vol. 40.

Kooi, Frank, "Yellow Lessens Discomfort Glare: Physiological Mechanism(S)", TNO Human Factors, Netherlands, Contract No. FA8655-03-1-3043, (Mar. 9, 2004).

Kuller & Laike (1998) "The Impact of Flicker from Fluorescent Lighting on Well-Being, Perfiormance and Physiological Arousal" Ergonomics 41(4):433-447.

Lakatos (2006) "Recent trends in the epidemiology of Inflammatory Bowel Disease: Up or Down?" World J Gastroenterol 12(38):6102.

Mace, Douglas, et al., "Countermeasures for Reducing the Effects of Headlight Glare", The Last Resource, Prepared for the AAA Foundation for Traffic Safety, pp. 1 to 110, (Dec. 2001).

Mehta, Arpit, "Map Colors of a CIE Plot and Color Temperature Using an RGB Color Sensor", Strategic Applications Engineer, Maxim Integrated Products, A1026, p. 1-11, (2005).

N. T. Obot, W. J. Douglas, A S. Mujumdar, "Effect of Semi-confinement on Impingement Heat Transfer", Proc. 7th Int. Heat Transf. Conf., 1982, pp. 1355-1364. vol. 3.

Ortner & Dorta (2006) "Technology Insight: Photodynamic Therapy for Cholangiocarcinoma" Nat Clin Pract Gastroenterol Hepatol 3(8):459-467.

Rea (2010) "Circadian Light" J Circadian Rhythms 8(1):2.

Rea et al. (2010) "The Potential of Outdoor Lighting for Stimulating the Human Circadian System" Alliance for Solid-State Illumination Systems and Technologies (ASSIST), May 13, 2010, p. 1-11.

Rosco Laboratories Poster "Color Filter Technical Data Sheet: #87 Pale Yellow Green" (2001).

Sivak, Michael, et al., "Blue Content of LED Headlamps and Discomfort Glare", The University of Michigan Transportation Research Institute, Report No. UMTRI-2005-2, pp. 1-18, (Feb. 2005).

S. A Solovitz, L. D. Stevanovic, R. A Beaupre, "Microchannels Take Heatsinks to the Next Level", Power Electronics Technology, Nov. 2006.

Stevens (1987) "Electronic Power Use and Breast Cancer: A Hypothesis" Am J Epidemiol 125(4):556-561.

Stockman, Andrew, "The spectral sensitivity of the human short-wavelength sensitive cones derived from thresholds and color matches", Pergamon, Vision Research 39, pp., 2901-2927 (1999).

Tannith Cattermole, "Smart Energy Class controls light on demand", Gizmag.com, Apr. 18, 2010 accessed Nov. 1, 2011.

Topalkara et al. (1998) "Effects of flash frequency and repetition of intermittent photic stimulation on photoparoxysmal responses" Seizure 7(13):249-253.

Veitch & McColl (1995) "Modulation of Fluorescent Light: Flicker Rate and Light Source Effects on Visual Performance and Visual Comfort" Lighting Research and Technology 27:243-256.

Wang (2005) "The Critical Role of Light in Promoting Intestinal Inflammation and Crohn's Disease" J Immunol 174 (12):8173-8182.

Wilkins et al. (1979) "Neurophysical aspects of pattern-sensitive epilepsy" Brain 102:1-25.

Wilkins et al. (1989) "Fluorescent lighting, headaches, and eyestrain" Lighting Res Technol 21(1):11-18.

Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

United States Patent and Trademake Office's Non-Final Office Action dated Sep. 11, 2015 for related U.S. Appl. No. 13/969,103 filed Aug. 16, 2013.

\* cited by examiner

SELF-CALIBRATING MULTI-DIRECTIONAL SECURITY LUMINAIRE AND ASSOCIATED METHODS

RELATED APPLICATIONS

This application claims the benefit of U.S. Provisional Patent Application Ser. No. 61/644,152 titled SELF-CALIBRATING MULTI-DIRECTIONAL SECURITY LUMINAIRE AND ASSOCIATED METHODS, filed on May 8, 2012, the entire contents of which are incorporated herein by reference. This application is also related to U.S. patent application Ser. No. 13/234,371 filed Sep. 16, 2011, titled COLOR CONVERSION OCCLUSION AND ASSOCIATED METHODS, U.S. patent application Ser. No. 13/107,928 filed May 15, 2011, titled HIGH EFFICACY LIGHTING SIGNAL CONVERTER AND ASSOCIATED METHODS, U.S. patent application Ser. No. 13/403,531 filed Feb. 23, 2012, titled CONFIGURABLE ENVIRONMENTAL CONDITION SENSING LUMINAIRE, SYSTEM AND ASSOCIATED METHODS, U.S. patent application Ser. No. 13/464,292 filed May 4, 2012, titled INTELLIGENT SECURITY LIGHT AND ASSOCIATED METHODS, and U.S. patent application Ser. No. 13/464,345 filed May 4, 2012, titled OCCUPANCY SENSOR AND ASSOCIATED METHODS, and U.S. Provisional Patent Application Ser. No. 61/777,585 filed Mar. 12, 2013 titled EDGE LIT LIGHTING DEVICE, the entire contents of each of which are incorporated herein by reference.

FIELD OF THE INVENTION

The present invention relates to the field of lighting devices and, more specifically, to lighting devices capable of self-calibrating brightness and directional lighting.

BACKGROUND OF THE INVENTION

Current security-based luminaires have several problems associated with them. If they are activated too brightly all the time, they are inefficient. If they are not bright enough, trespassers may not be deterred, and security cameras may be rendered useless. However, environmental lighting changes, and luminaires may not adapt to the changing environment, rendering them even more inefficient. Further, if security lights are activated by an intruder, floodlights may light areas that do not need to be lit as well as areas that need lighting to capture sight of the trespasser, thereby wasting energy. If the lights are not properly positioned, the trespasser may still evade security measures. Previous attempted solutions included actuating parts to move a security light, but these prove inefficient, as actuating parts require more power. A need exists for a luminaire capable of adapting automatically to its environment for security purposes. Additionally, a need exists for a security luminaire that may selectively light a directional area when activated, while eliminating the need for actuating parts.

SUMMARY OF THE INVENTION

With the foregoing in mind, the present invention is related to a luminaire able to adjust its output light to a minimum effective value. Such a luminaire may allow for increased energy efficiency by necessarily using a minimum required power amount. Additionally, the present invention is related to a luminaire capable of directing its output light without a requirement for actuating parts.

These and other features, benefits and advantages are provided by a luminaire which may include a wall mount and a driver circuit housing connected to the wall mount. The luminaire may also include a camera housing connected to the driver circuit housing, a light source housing connected to the camera housing, a light source array carried by the light source housing, where the light source array includes a plurality of light sources. The luminaire may further include a prism carried by the light source housing that is adjacent to the light source array, a heat sink in thermal communication with the light source array that is also carried by the light source housing, and a camera carried by the camera housing. The luminaire may also include a sensor carried by the camera housing and a driver circuit carried by the driver circuit housing. The camera and/or the sensor may be configured to detect the presence and vicinity of an object in the target area and at least one of the light sources in the plurality of light sources may be configured to emit light to illuminate the vicinity of the object sensed in the target area.

The prism may be configured to direct the light emitted from the plurality of light sources in a direction of the object sensed in the target area. The luminaire may also include a light source which is a light-emitting diode (LED).

The luminaire may include light sources in the light source array which may be configured to emit light in multiple directions so that upon sensing an object in the target area, a selected at least one light source is illuminable to emit light in the direction of the sensed object. The luminaire may also include a controller. The sensor and camera may generate data based on a sensed condition and the controller may operate the light source array based upon the data and established parameters.

The luminaire may further include a time-keeping device in communication with the controller, where the time-keeping device may be configured to generate timing data to operate the light source array based on the timing data. The luminaire may also include a network connection in communication with the controller, where data may be transmittable through the network connection and the light source array may be operable so that it is responsive to the data transmitted through the network. The data may be related to detection of an object in the target area, where the data may be transmitted upon detection of the object in the target area.

The luminaire may be programmable to recognize a defined object so as not to illuminate the target area upon detecting the defined object. The brightness of the light emitted from the light source array may be variable depending on at least one of the time of day, size of the object detected in the target area, and detection of a malfunction in at least one of the camera and the sensor.

The luminaire may further include a light source housing which may include a first light source housing and a second light source housing. The light source array may include a first light source array including a plurality of light sources carried by the first light source housing and a second light source array including a plurality of light sources carried by the second light source housing. The prism may comprise a first prism carried by the first light source housing adjacent to the first light source array and a second prism carried by the second light source housing adjacent to the second light source array. The heat sink may include a first heat sink in thermal communication with the first light source array and carried by the first light source housing and a second heat sink in thermal communication with the second light source array and carried by the second light source housing.

The camera housing may include a first camera housing associated with the first light source housing and a second camera housing associated with the second light source housing. The camera may include a first camera carried by the first camera housing and a second camera carried by the second camp housing where the sensor includes a first sensor carried by the first camera housing and a second sensor carried by the second camera housing. The first and second cameras and the first and second sensors may be configured to detect the presence and vicinity of an object in a target area. The first and second light source arrays may be positioned within the first and second light source housings respectively to minimize the overlap of the light emitted from each light source array.

A method aspect of the invention may include illuminating a target area upon sensing an object using a luminaire. The luminaire may include a wall mount, a driver circuit housing connected to the wall mount, a camera housing connected to the driver circuit housing, a light source housing connected to the camera housing, a light source array carried by the light source housing, the light source including a plurality of light sources, a prism carried by the light source housing adjacent to the light source array, a heat sink in thermal communication with the light source array and carried by the light source housing, a camera carried by the camera housing, a sensor carried by the camera housing and a driver circuit carried by the driver circuit housing. The method may include defining parameters for a defined object and detecting an object to define a detected object. The method may further include determining if the detected object is a defined object and turning on the light source array in the direction of the detected object if the detected object is a defined object for which illumination is desired. The method may further include determining if the detected object is still within the vicinity of the luminaire and turning off the light source array if the detected object is no longer within the vicinity of the luminaire.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Additionally, in the following detailed description, reference may be made to the driving of light-emitting diodes, or LEDs. A person of skill in the art will appreciate that the use of LEDs within this disclosure is not intended to be limited to the any specific form of LED, and should be read to apply to light emitting semiconductors in general. Accordingly, skilled artisans should not view the following disclosure as limited to the any particular light emitting semiconductor device, and should read the following disclosure broadly with respect to the same.

Figure 1:
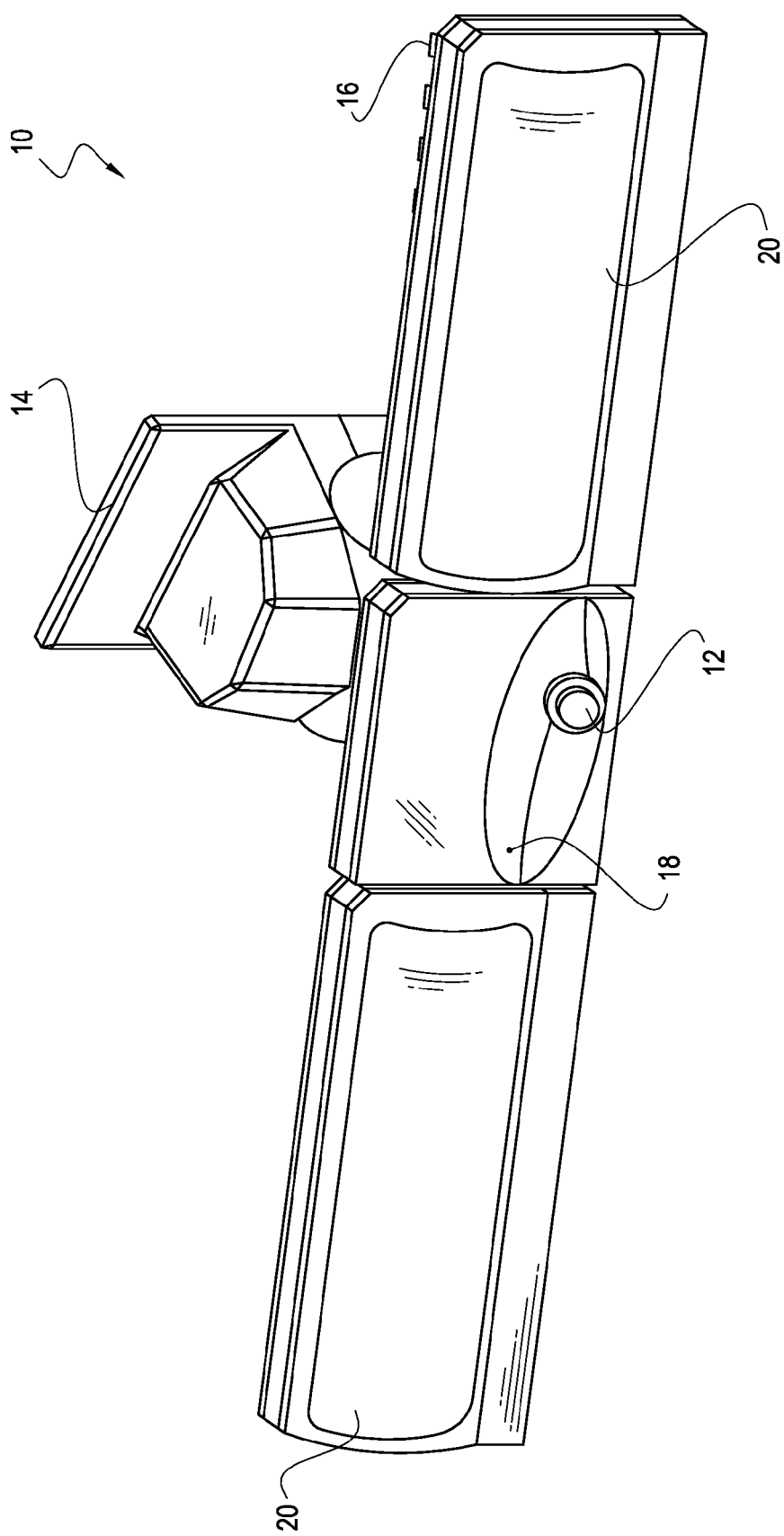
FIG. 1 is a perspective view of a luminaire according to an embodiment of the present invention.
Figure 2:
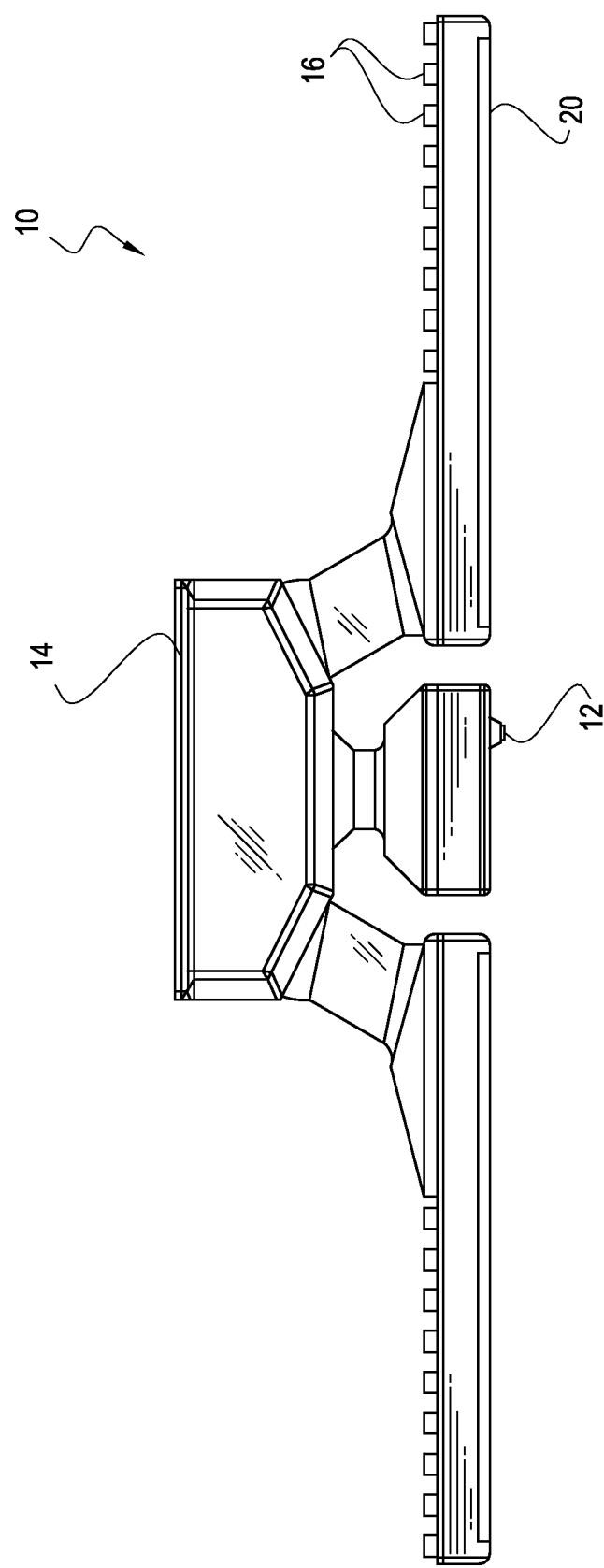
FIG. 2 is a top plan view of the luminaire of FIG. 1 according to an embodiment of the present invention.
Figure 3:
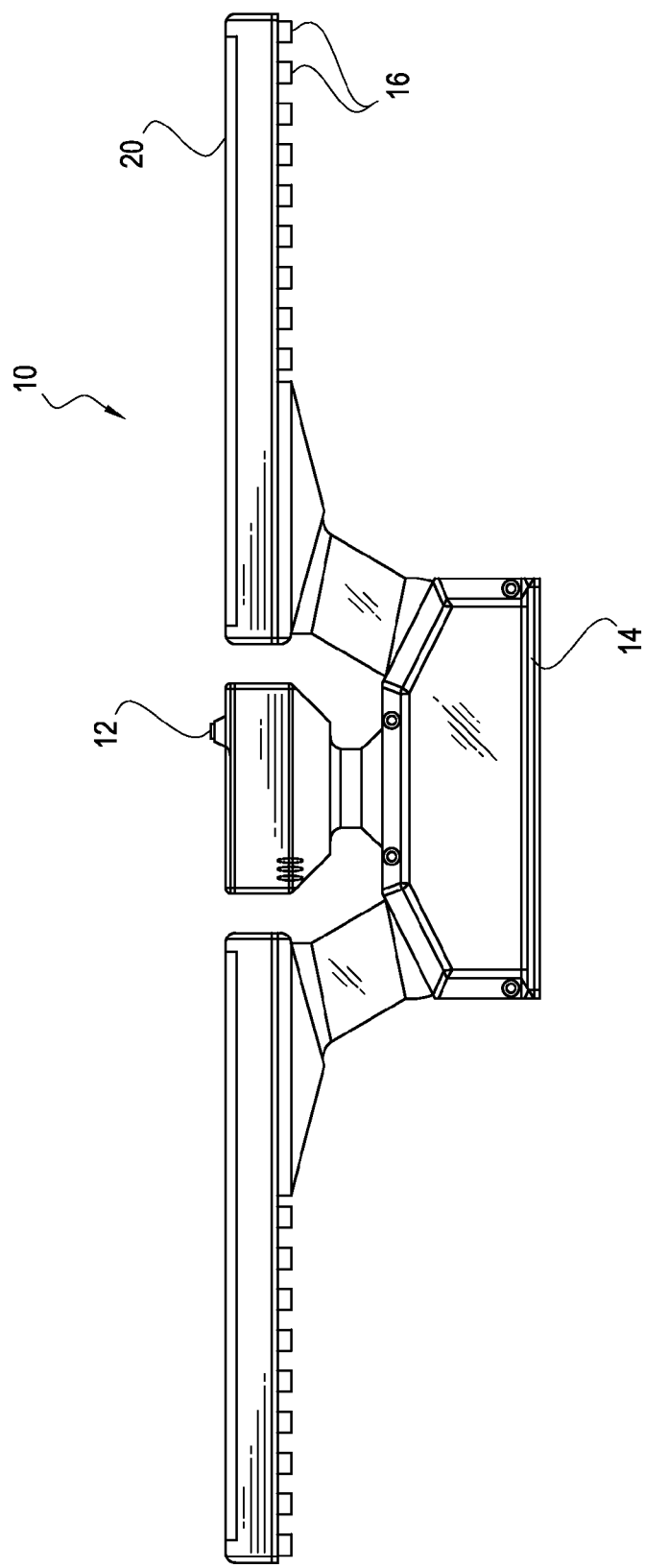
FIG. 3 is a bottom plan view of the luminaire of FIG. 1.
Figure 4:
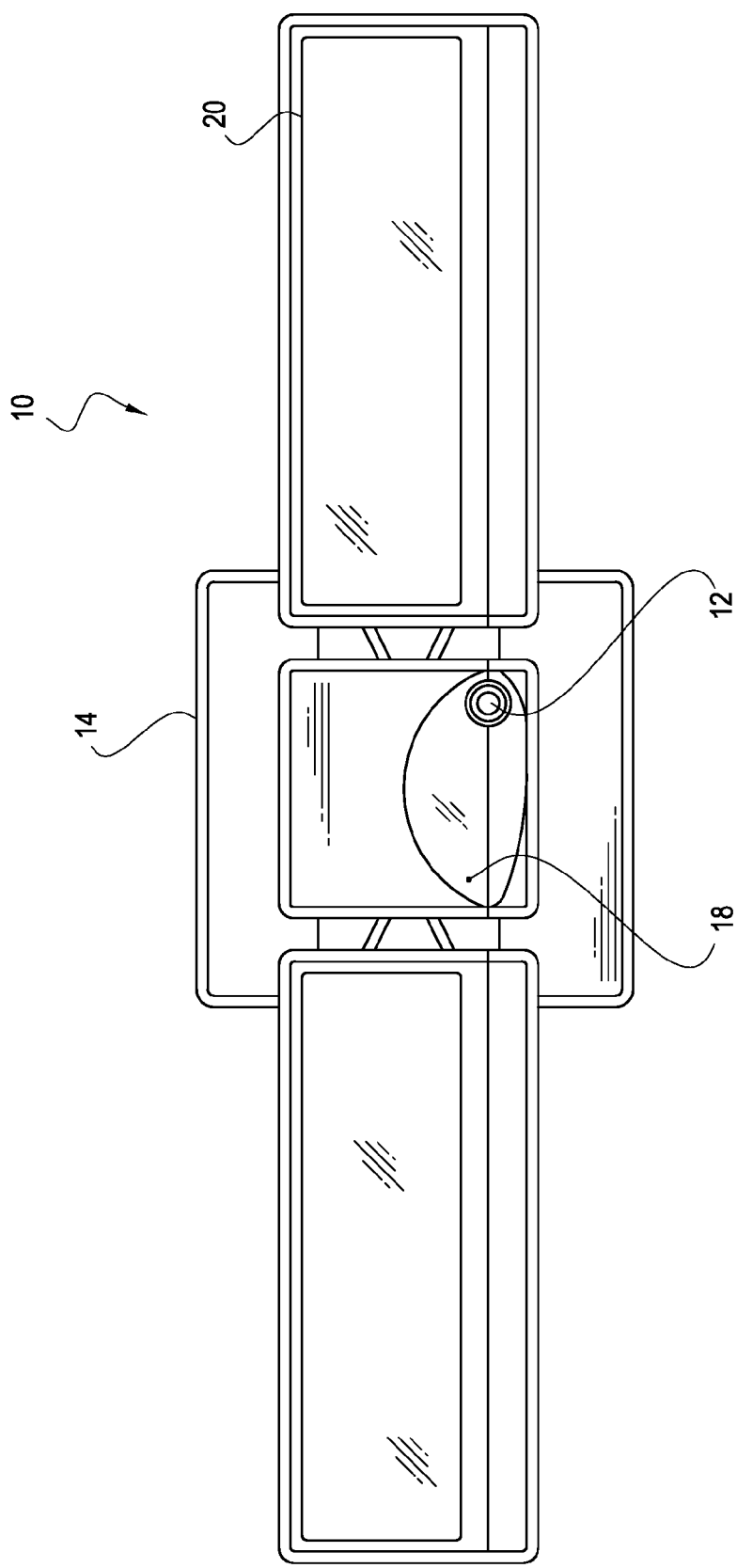
FIG. 4 is a front elevation view of the luminaire of FIG. 1.
Figure 5:
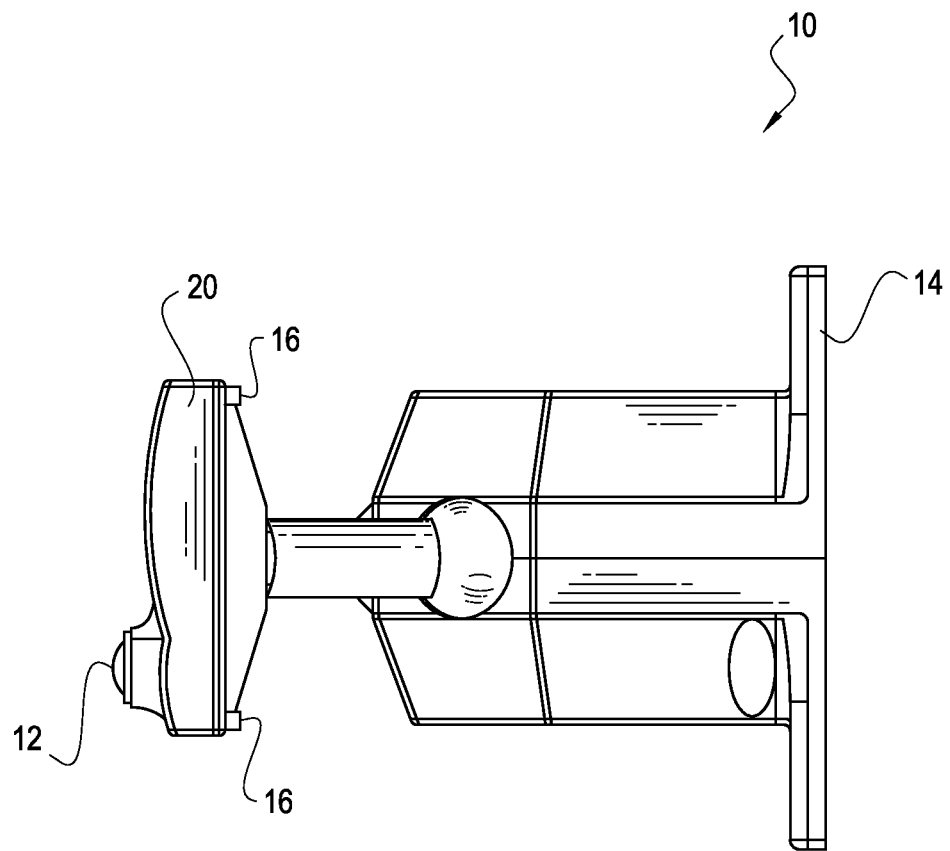
FIG. 5 is a side elevation view of the luminaire of FIG.

Referring now to FIGS. 1-13, a self-calibrating multi-directional luminaire 10 will be discussed. As shown in FIG. 1, the luminaire 10 may include a camera 12, a wall mount 14, a heat sink 16, a sensor 18, and LED housings 20. The terms LED housing and light housing are used interchangeably. Referring additionally to FIGS. 2 and 3, the heat sink(s) 16 may be seen in greater detail in relation to the wall mount 14, the LED housing 20, and the camera 12 of the luminaire 10. Referring also to FIGS. 4 and 5, the heat sinks 16 may be positioned on the back side of the luminaire 10 generally facing the wall mount 14 and generally opposite the LED housing 20, the camera 12, and the sensor 18. A skilled artisan will appreciate, after having had the benefit of this disclosure, that the heat sinks 16 may be positioned on the luminaire 10 in any number of ways that may dissipate heat in order to maximize efficiency.

Figure 6:
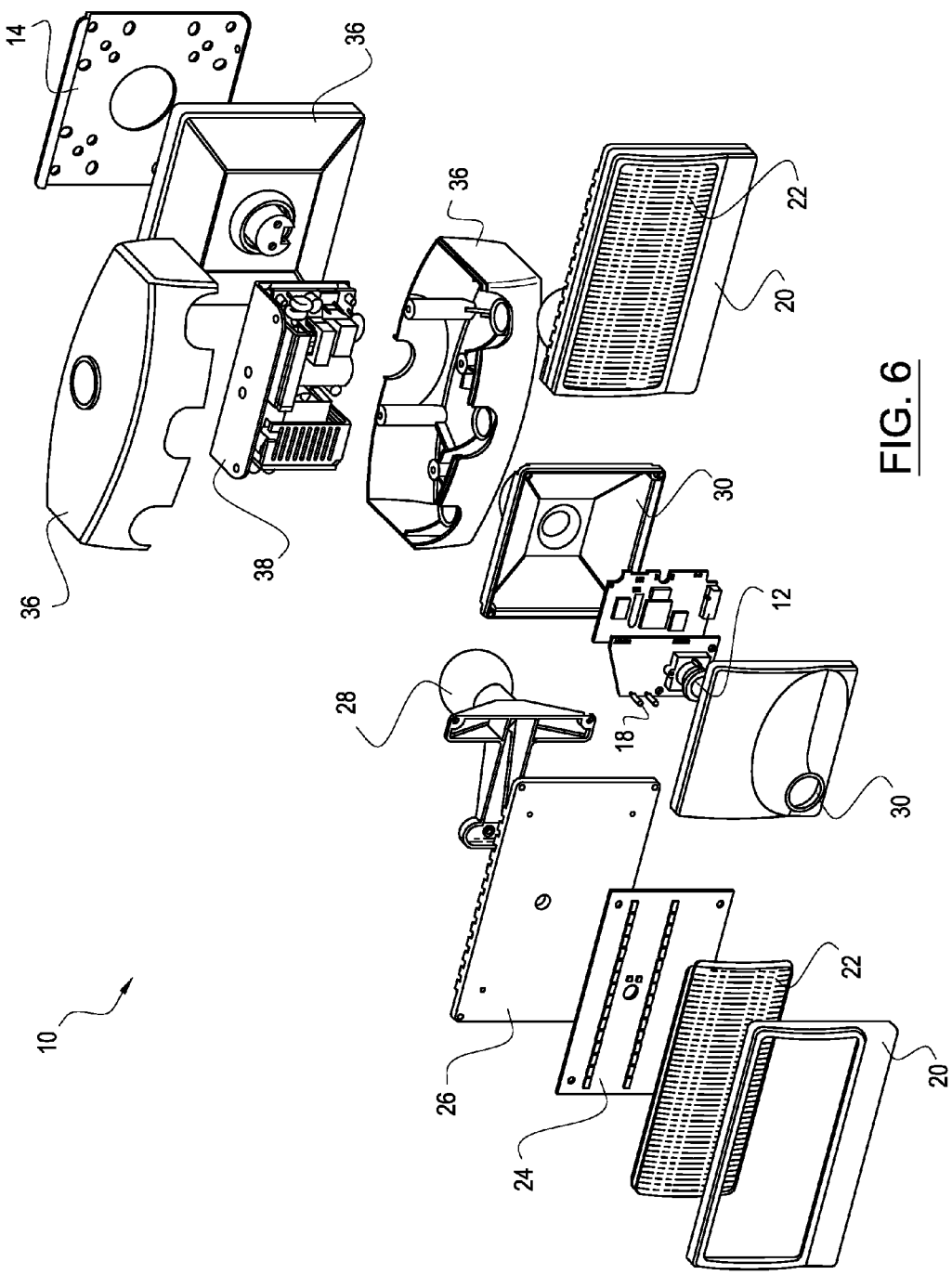
FIG. 6 is an exploded perspective view of the luminaire of FIG. 1.

Referring now to FIG. 6, a luminaire 10 is presented in greater detail. The LED housings 20 may contain a prism 22, which may overlie an LED array 24. The terms LED array and light source array are used interchangeably, and the terms LED housing and light source housing are also used interchangeably. The light source array 24 may include a plurality of light sources. The LED array 24 may be backed by a heat sink 16 and may be integrated into the light source housing 20. Additionally, the arm 28, may connect the LED housing 20 to the rest of the luminaire 10. The camera 12 and the sensor 18 may be housed in camera housing 30, which, along with the arm 28, may connect to a driver circuit housing 36. The driver circuit housing(s) 36 may be configured to house a driver circuit 38, and may be configured to be positioned adjacent to the wall mounting such that the driver circuit housing 36 backs up to the wall mounting 14. Many additional configurations of the luminaire 10 may readily come to mind of one skilled in the art having had the benefit of this disclosure, including an LED housing without a prism 22, and are included within the scope of the invention. The LED array 24 may be implemented with a plurality of LEDs or a plurality of any light source known in the art to a skilled artisan.

In some embodiments of the present invention, the luminaire 10 may further include a light source housing which may include a first light source housing and a second light source housing, each of which may be configured similar to the light source housing 20 described hereinabove. The light source array 24 may include a first light source array which includes a plurality of light sources carried by the first light source housing and a second light source array which includes a plurality of light sources carried by the second light source housing, each of which may be configured similar to the light source array 24 as described hereinabove. The prism 22 may comprise a first prism carried by the first light source housing adjacent to the first light source array and a second prism carried by the second light source housing adjacent to the second light source array, each of which may be configured similar to the prism 22 as described hereinabove.

The heat sink 16 may include a first heat sink in thermal communication with the first light source array and carried by the first light source housing and a second heat sink in thermal communication with the second light source array and carried by the second light source housing, each of which may be configured similar to the heat sink 16 as described hereinabove. The camera housing 30 may include a first camera housing associated with the first light source housing and a second camera housing associated with the second light source housing, each of which may be configured similar to the camera housing 30 as described hereinabove.

The camera 12 may include a first camera carried by the first camera housing and a second camera carried by the second camera housing where the sensor 18 includes a first sensor carried by the first camera housing and a second sensor carried by the second camera housing, each of which may be configured similar to the camera 12 and the sensor 18, respectively, as described hereinabove. The first and second cameras 12a, 12b and the first and second sensors 18a, 18b may be configured to detect the presence and vicinity of an object in a target area. Types of cameras that may be used as either of the first and second cameras 12a, 12b include, but is not limited to, CCD cameras, CMOS cameras, digital imaging cameras, and digital video cameras. Types of sensors that may be used as either of the first and second sensors 18a, 18b, includes, but is not limited to, light sensors, thermal sensors, infrared sensors, motion sensors, ultrasonic sensors, microwave sensors, tomographic sensors, and the like. The first and second light source arrays may be positioned within the first and second light source housings respectively to minimize the overlap of the light emitted from each light source array. Alternatively, the first and second light source arrays may be positioned within the first and second light source housings respectively to optimize the illumination of the target area.

Some embodiments of the luminaire 10 according to the present invention may include multiple elements. For example, a luminaire may include multiple light source arrays including a plurality of light sources, multiple controllers, multiple cameras, multiple sensors, multiple heat sinks and the like.

Figure 15:
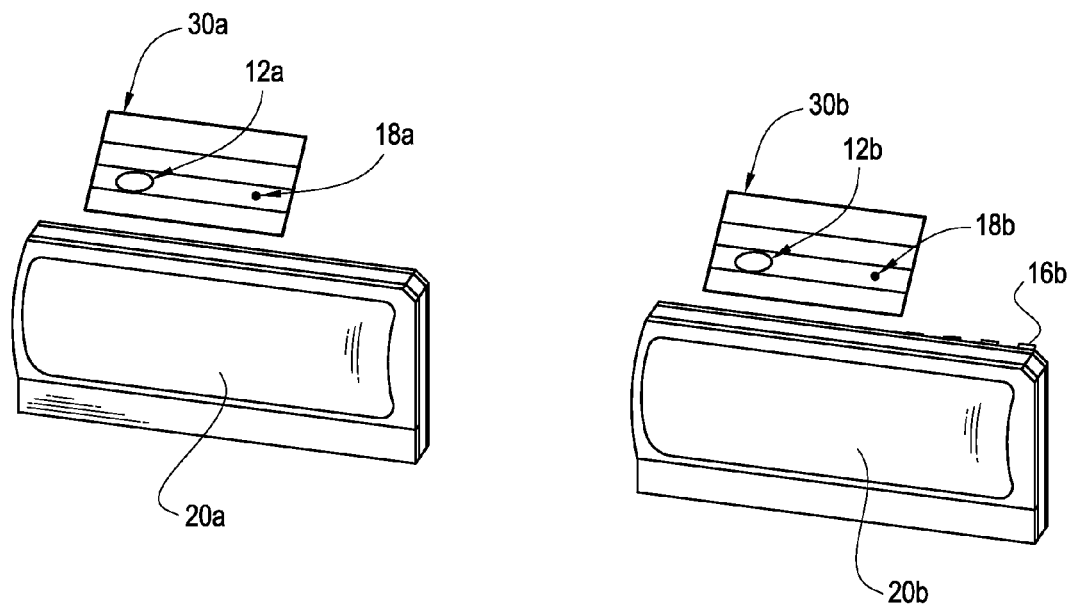
FIG. 15 is a perspective view of a luminaire according to an alternative embodiment of this invention.

Referring to FIG. 15, an alternative embodiment of the invention is illustrated. The luminaire 40 according to another embodiment of the present invention may include a first light source housing 20a and a second light source housing 20b. The luminaire 40 may also include other elements included in the luminaire 10 of the first embodiment of the present invention, described hereinabove, such as a driver circuit housing which includes a driver circuit, a controller, an arm and a wall mount. Accordingly, and for the sake of clarity, it is to be understood, and as will be discussed in greater detail below, that the first light source housing 20a and the second light source housing 20b are connected to one another by way of the arm and wall mount that are described (but not shown in FIG. 15) above in the embodiment of the luminaire 10 illustrated and described, for example, in FIGS. 1 and 2.

Although some of the elements may not be illustrated in FIG. 15.A, the first light source array (not shown) may be carried by the first light source housing 20a where the first light source array may include a plurality of light sources. The luminaire 40 may further include a second light source array (not shown) which may be carried by the second light source housing 20b where the second light source array (not shown) may include a plurality of light sources. The first prism (not shown) which may be carried by the first light source housing 20a may be adjacent to the first light source array and the second prism (not shown), which may be carried by the second light source housing 20b may be adjacent to the second light source array.

A first heat sink (not shown) may be in thermal communication with the first light source array and carried by the first light source housing 20a. A second heat sink 16b may be in thermal communication with the second light source array and carried by the second light source housing 20b. The first camera 12a and first sensor 18a may be carried by the first camera housing 20a and the second camera 12b and second sensor 18b may be carried by the second camera housing 20b. A controller (not shown) may be in communication with the first and second cameras 12a, 12b and the first and second sensors 18a, 18b where at least the first camera 12a, second camera 12b, first sensor 18a and second sensor 18b may be configured to detect presence and vicinity of an object in a target area. At least one light source in the plurality of light sources of the first and second light source array may be configured to emit light to illuminate the vicinity of the object sensed in the target area. At least one of the first and second cameras 12a, 12b or first and second sensors 18a, 18b may generate data based on a sensed condition and the controller may operate any of the plurality of light sources from the first and second light source array based upon the data and established parameters.

Figure 16:
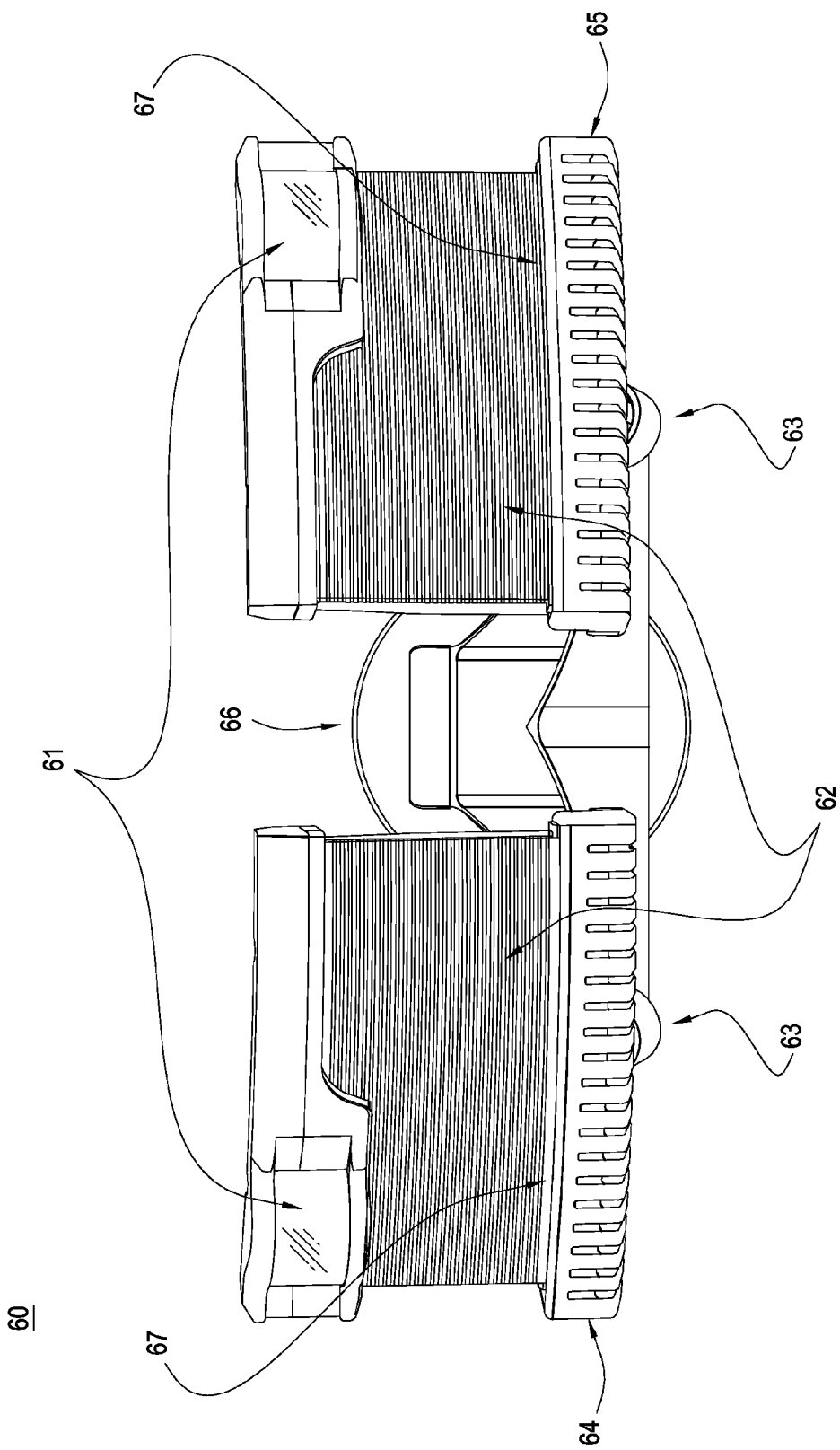
FIG. 16 is a perspective view of a luminaire according to a further embodiment of the invention.

Referring to FIG. 16, yet another embodiment of the invention is illustrated. The luminaire 60 illustrated in FIG. 16 may include cameras 61, optics 62, arms 63, heat sinks 65, wall mount 66 and LEDs 67. The luminaire 60 utilizes edge lighting where the LEDs 67 are embedded at the base of the optic 62. The optic 62 is designed with ridges that are designed to redirect light from the LED 67 outward. The luminaire 60 is designed to function similarly to luminaire 10 and 40 previously described.

Referring again back to FIG. 6, detection of an object in the target area may be achieved using the camera 12, the sensor 18 or some combination of the camera and sensor of the luminaire 10 according to an embodiment of the present invention. The terms security light and luminaire may be used interchangeably herein. More particularly, those skilled in the art will appreciate that the camera 12 of the security light 10 may be used in connection with sensor 18 for sensing objects that may enter a target area. Alternately, however, the sensors 18 may be provided by any type of motion detecting device. Both the sensor 18 and the camera 12 may be positioned in communication with a controller and may generate data based on a sensed condition. The data that is generated may be processed in order to operate the security light 10 based on certain parameters or rules.

The parameters may define how long the luminaire is activated depending upon the size of the object detected, the time of the day and the type of the object detected. The controller may also utilize the parameters so that the amount of time that the target area is illuminated may be responsive to the parameters. The parameters may be set by a user or the controller may utilize default settings that may be set by a security company or a factory upon manufacture. When an object is sensed in the target area, a light source in the plurality of light sources may be configured to emit light to illuminate the vicinity of the object sensed in the target area. In an embodiment of the invention, such as is illustrated, for example, in FIG. 15, skilled artisans may appreciate that the plurality of cameras and sensors may operate in concert and/or separately so that the luminaire 40 may detect or sense objects in the target area. Skilled artisans may also appreciate that a controller may be utilized to operate the plurality of light source arrays either in concert and/or separately responsive to data regarding sensed objects in the target area.

Accordingly, the light source array 24 of the security light 10 according to an embodiment of the present invention may be set to an on state based on detection of an object, or movement, within the target area. This may be defined as an event that occurs within the target area. Further embodiments of the present invention contemplate that the security light 10 may be moved to an off state after a period of no movement, after an object is no longer detected in the target area, or after the previously sensed condition is no longer sensed. It is readily contemplated that certain objects may move in and out of the target area without the necessity of moving the light source of the security light 10 to the on state. For example, the present invention contemplates that various creatures of nature, e.g., vermin, may move in and out of the target area without the need to move the light source 24 of the security light 10 to the on state. This advantageously enhances efficiency of the security light 10 according to an embodiment of the present invention.

The present invention also contemplates that a time-keeping device may be positioned in communication with the controller. Accordingly, in some embodiments, timing data may be transmitted to the controller so that operation of the light source 24 of the security light 10 may be controlled based on the timing data. For example, the light source 24 may be turned to the on state only after an object is detected in the target area for a period of time that exceeds a threshold period of time. This too may be defined as an event, i.e., an event may include a timing component. Accordingly, this advantageously provides the security light 10 according to an embodiment of the present invention with a delay feature that provides for a delay before moving the light source 24 of the security light 10 to the on state until an object has been detected in the target area for a period of time that exceeds the threshold time, or until motion is detected in the target area for a similar period of time. Similarly, the present invention contemplates that after a period of time of detecting no motion, or object located in the target area, the light source 24 that may be moved to the off state. Further, the time-keeping device may be used to keep the light source 24 in the on state for a fixed period of time. In some embodiments, the time-keeping device may be an atomic clock.

It is also contemplated that the target area may be manipulated. More specifically, the target area may be user selected. Further, it is contemplated that the target area may be manipulated remotely through communication with the network. A user interface may be used to move the target area, change the size of the target area, or take any number of factors into account when sensing movement or detecting presence of an object in the target area. For example, it is contemplated that the target area may have a first size during a first period of time, and a second size during an alternate period of time. Similarly, it is contemplated that the target area sensed by the sensor 18 of the security light 10 may be split into an array of target areas. Accordingly, the security light 10 according to an embodiment of the present invention contemplates that various portions of the array of target areas may be activated (or selectively activated) based on any number of factors including, but not limited to, user preference, timing, or any other number of factors that may be readily understood by the skilled artisan after having had the benefit of reading this disclosure.

Figure 7A:
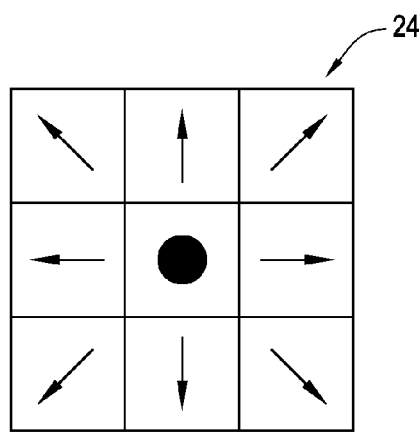
FIG. 7A is a schematic view of an array of LEDs to be used in a luminaire according to an embodiment of the present invention.

Referring now to FIGS. 7A-9, methods of achieving selective directional lighting according to embodiments of the present invention will now be discussed. Referring now to FIGS. 7A and 7B, arrays of LEDs 24 are presented. As shown in both figures, the LEDs 24 may be positioned in a variety of directions, including straight ahead, and may be selectively activated to emit light in a particular direction towards a detected object, if an object is detected in a target area. Additionally, a user may turn on the LEDs 24 using a user interface on a remote device 35, which will be discussed in greater detail below.

Figure 7B:
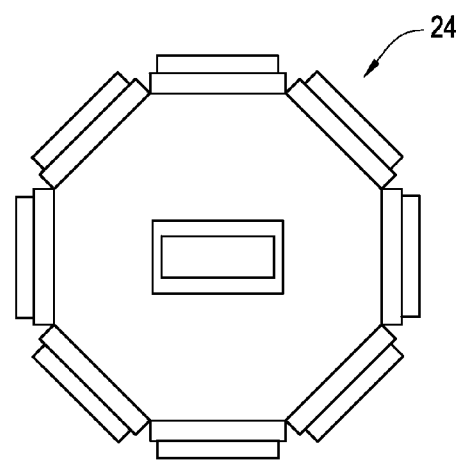
FIG. 7B is an alternate schematic view of an array of LEDs to be used in a luminaire according to an embodiment of the present invention.
Figure 8:
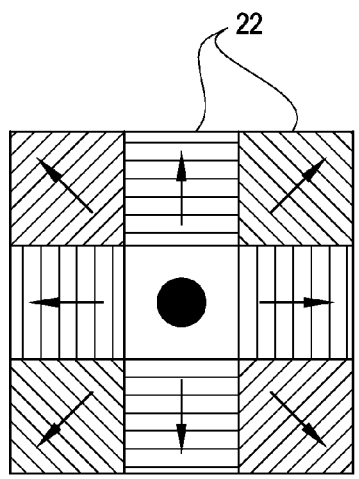
FIG. 8 is a schematic view of an array of prisms overlaying an array of LEDs to be used in a luminaire according to an embodiment of the present invention.
Figure 9:
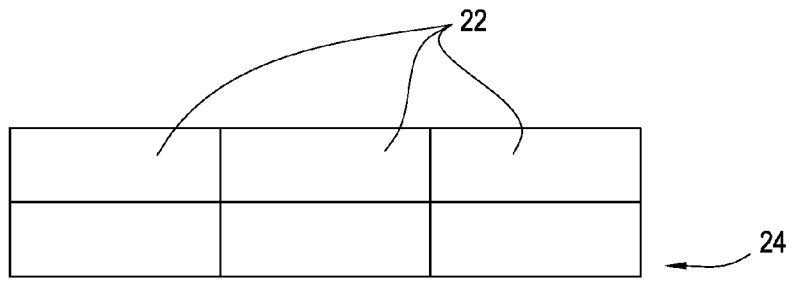
FIG. 9 is a schematic side view of the array of prisms overlaying the array of LEDs to be used in a luminaire as shown in FIG. 1.

In some embodiments, and with reference to FIGS. 8 and 9, an array of LEDs may be overlaid with a plurality of prisms 22. In this embodiment, the LEDs may be facing a single direction, but may have their light directed in a plurality of directions by the plurality of prisms 22, as shown in FIG. 8. When an object is sensed in the target area, certain LEDs of the LED array may be operated to emit light that, when directed by the prism 22 emits light in the direction of the object sensed in the target area. The overlaying of the prisms 22 on the array of LEDs 24 is perhaps best illustrated in FIG. 9. The configurations shown in FIGS. 7A-9 are, of course, exemplary in nature, and may be rearranged while still accomplishing the goals, features, and objectives of the present invention.

Accordingly, the security light 10 according to an embodiment of the present invention provides directional illumination of portions of the target area based on the location within the target area where the motion is detected, or based on the location within the target area where an object is detected. As indicated above, the target area may be divided into an array of target areas, i.e., the target area may include multiple target areas. Each target area may be directed to a specific geographic location within the sensing area. It is contemplated that the array of target areas may overlap with one another, i.e., adjacent target areas may overlap with one another to advantageously ensure that there is not an area within the target area that goes undetected. As perhaps best illustrated in FIGS. 7A-7B, the bank of LEDs may be split into an array of LEDs. As illustrated in FIG. 7A, the array of LEDs may be positioned to face in different directions, i.e., different orientations. Accordingly, upon sensing movement or detecting the presence of an object in a particular portion of the target area, the LED in the array of LEDs facing that particular direction may be illuminated. The security light 10 according to an embodiment of the present invention advantageously illuminates the portion of the target area where the motion is detected, or where an object may be detected, i.e., where the event has occurred.

This advantageously increases the efficiency of the security light 10 by only illuminating the area within the target area where an event has been sensed. An event may, for example, be defined by an object located within a portion of the target area, or movement within the target area. As indicated above, the sensor may be in communication with the time-keeping device to provide for a delay to allow for the events to be classified as an event suitable for moving the light source 24 of the security light 10 from the off state to the on state. In other words, the light source 24 of the security light 10 is only illuminated in the direction where the event occurred if it is determined that the light source 24 should be activated, i.e., upon determining that an event has actually occurred.

The processor can process the data received from the camera 12 and/or the sensor 18 so that other LEDs of the array of LEDs may be activated to illuminate different portions of the target area if it is determined that the object has moved from one portion of the target area to another portion of the target area. In such an embodiment, it is contemplated that the portion of the target area that was initially illuminated may remain illuminated as another portion of the target area is illuminated by at least one of the LEDs in the array of LEDs 24. In some embodiments, it is also contemplated that the initial LED that was moved to the on state to illuminate the portion of the target area where the event originally occurred may be moved to the off state upon sensing that an event is no longer occurring in that portion of the target area. Furthermore, in some embodiments, where the detected object is determined to be in motion, an anticipated future location of the detected object may be estimated by the processor, and at least one of the LEDs of the array of LEDs may be illuminated to emit light in the direction of the anticipated future location. The embodiment of the LEDs 24 illustrated in FIG. 7B is another arrangement of the array of LEDs that advantageously provides for illumination of the target area in many different directions. Those skilled in the art will appreciate that the configurations of the array of LEDs illustrated in FIGS. 7A-7B are not meant to be limiting in any way but, instead, are provided for exemplary purposes.

As perhaps best illustrated in FIG. 8, the LEDs may all be similarly positioned, and the direction in which the light from the light source 24 of the security light 10 is emitted may be manipulated using a prism 22. The prism 22 may include an array of directional prisms positioned over the LEDs. Accordingly, upon detecting an event that occurs within a particular portion of the target area, the LEDs 24 behind a prism 22 facing in the direction of the target area where the event was detected may be illuminated, thereby emitting light in the direction of the target area where the event was detected. Again, this advantageously enhances the efficiency of the security light 10 according to an embodiment of the present invention.

Figure 10:
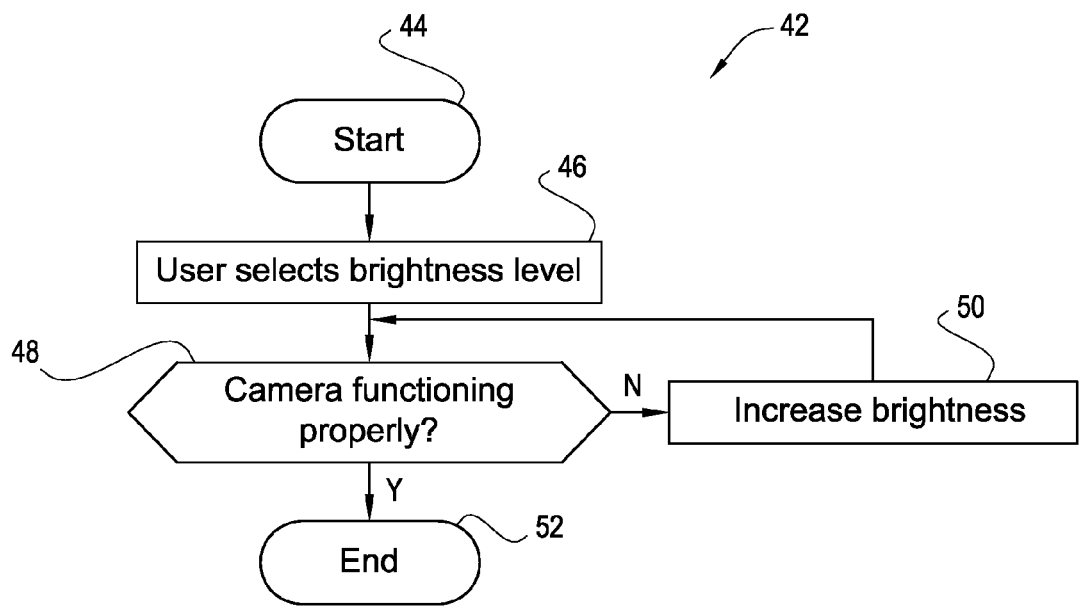
FIG. 10 is a flowchart demonstrating the operation of a luminaire according to an embodiment of the present invention allowing for a manual brightness level adjustment.
Figure 11:
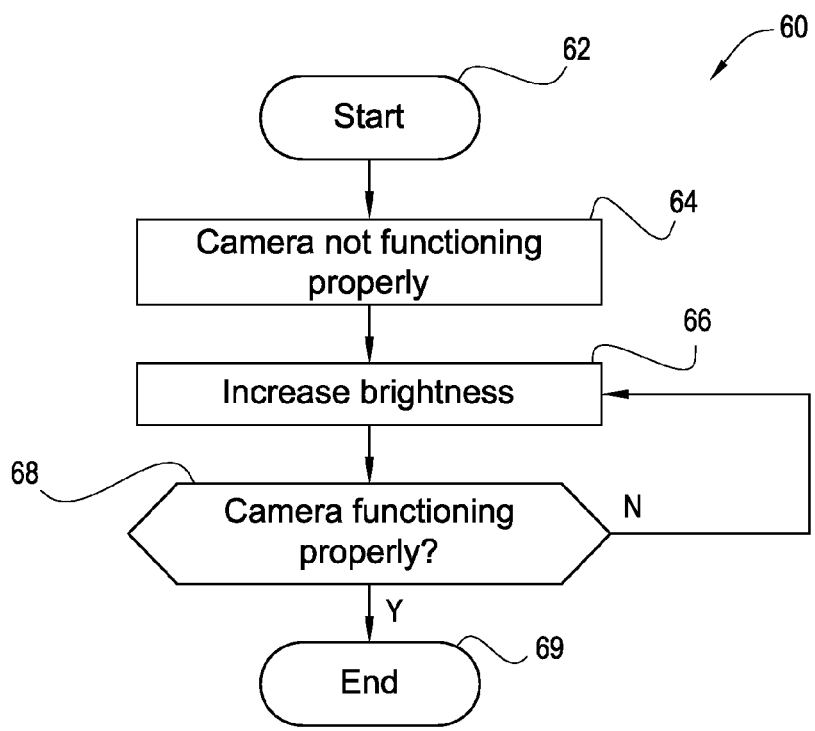
FIG. 11 is a flowchart demonstrating the operation of a luminaire according to an embodiment of the present invention allowing for an automatic brightness level adjustment.
Figure 12:
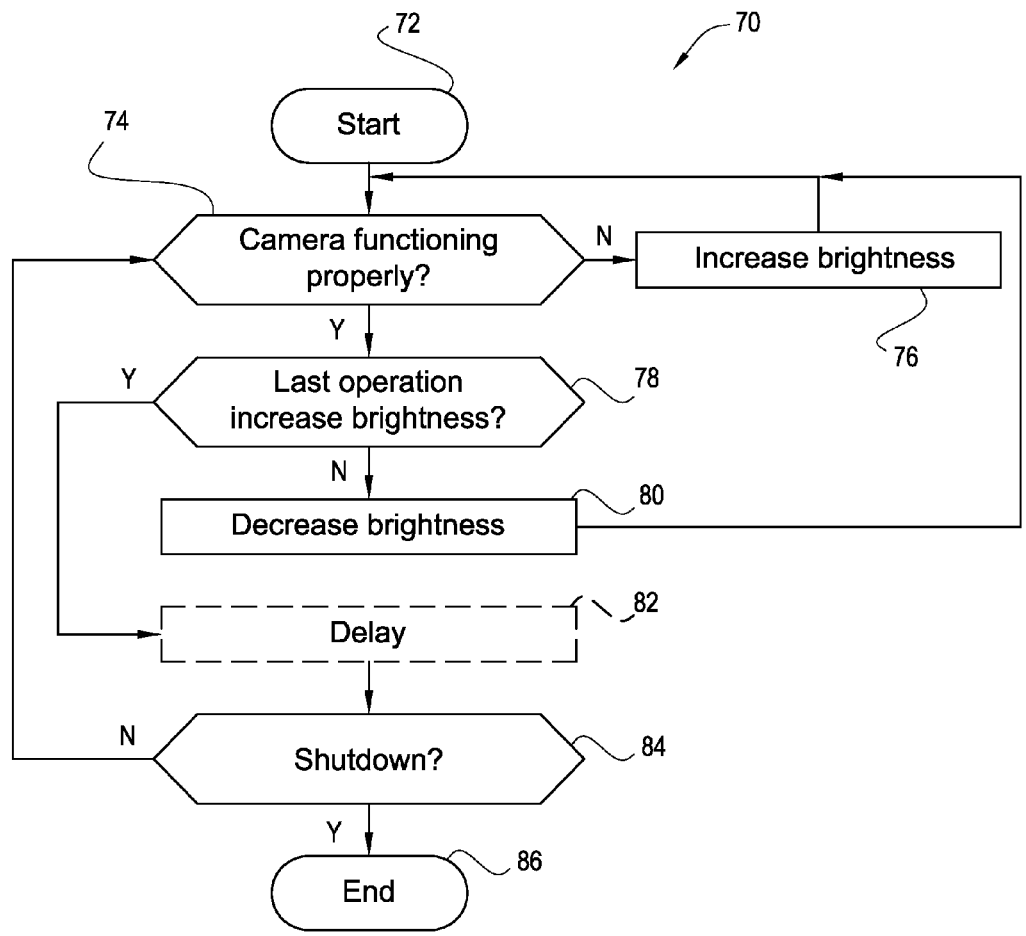
FIG. 12 is a flowchart demonstrating an alternate embodiment of operation of a luminaire according to an embodiment of the present invention allowing for an automatic brightness level adjustment.
Figure 13:
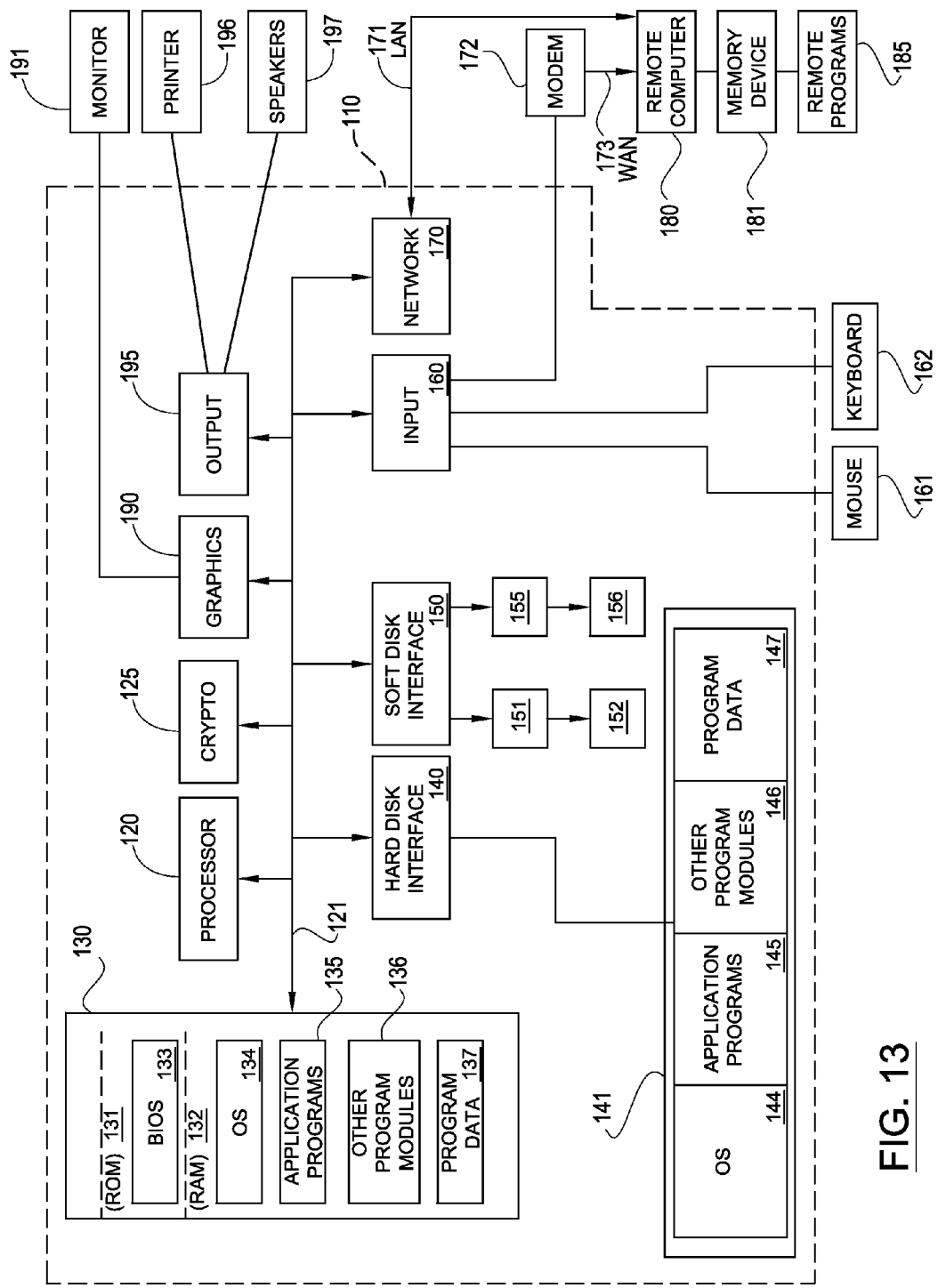
FIG. 13 is a schematic depiction of a model computing device according to an embodiment of the present invention.

Referring now to FIGS. 10-12, calibrating aspects of a security light as described herein above of an embodiment of will be discussed in greater detail. For instance, and with reference to flowchart 42 of FIG. 10, from the start (Block 44) a user may select a brightness level using a remote device (Block 46). The sensor 18 may check if the camera 12 is functioning properly at Block 48, and may increase the brightness at Block 50 if the camera 12 is not functioning properly. Once the brightness is increased, the sensor 18 may again check if the camera 12 is functioning properly at Block 48. If the camera 12 is functioning properly at Block 48, the process may end at Block 52. This prevents a user from selecting a brightness that is below a minimum brightness requirement for the camera 12 to work properly. More specifically, in order for the security camera 12 of the luminaire 10 according to an embodiment of the present invention to properly function, a certain amount of light must be present. If, however, there is more than the minimum amount of light necessary for the security camera to function, then the security light 10 may be considered somewhat inefficient or, more accurately, not as efficient as it possibly can be. Accordingly, the method set forth in flowchart 42 of FIG. 10 indicates one way in which a minimum brightness level of the light source of the security light 12 may be set. That is, the method set forth in FIG. 10 demonstrates a manual method of increasing and decreasing the brightness of the light source 24 of the security light 12 according to an embodiment of the present invention to ensure that the security light 12 is operating as efficiently as possible.

Referring now to flowchart 60 of FIG. 11, a method of self-calibrating a security light as described hereinabove according to an embodiment of the present invention will be discussed. As will be discussed in greater detail below, this embodiment of operating the security light 12 advantageously eliminates the need for initial user input. From the start (Block 62), the sensor 18 may detect that the camera is not functioning properly at Block 64. This may be caused by any number of reasons, but the one of the problems that the various embodiments of the present invention aims to solve is a malfunctioning of the camera due to brightness levels not being high enough. Accordingly, the brightness may then be increased (Block 66), and the sensor 18 may check if the camera 12 is functioning properly at Block 68. If the camera 12 is still not functioning properly, the brightness may be increased again at Block 66. If, however, the camera 12 is functioning properly at Block 68, then the method may end at Block 69. This method may prevent the light source on the security light 10 from becoming too dim for the camera 12 to function.

The function described with reference to the flow chart 60 illustrated in FIG. 11 may be carried out at any time. For example, the self-calibrating function may be carried out as an initialization process when the security light 10 is first installed. Similarly, the self-calibrating function may be carried out as ambient light levels in the environment where the security light is positioned are sensed. The various embodiments of the present invention also contemplate that the self-calibrating function may be carried out based on a prompt, or command, received from a user. This prompt or command may be received from a user device. More particularly, the user device may, for example, be a computer, cell phone, smart phone, tablet, PDA or the like. In such an embodiment of the security light 10 according to an embodiment of the present invention, the security light may be positioned in communication with a network, and may receive signals or data to operate through the network. The data may be related to detection of an object in the target area and may be transmitted upon detection of an object in the target area. In some embodiments, the data may be transmitted to a cloud so that remote computerized devices may be able to view and monitor the activity of the luminaire. The data may include still images, video, audio and time stamps or any other information as known to a skilled artisan. The data may also be transmitted to a security company and/or directly to a user device. Transmission of the data to the security company and/or user device may occur when a defined object is detected in the target area for a period of time as set in the parameters. Additional details regarding communication of signals to the security 10 can be found in U.S. Provisional Patent Application Ser. No. 61/486,314 titled Wireless Lighting Device and Associated Methods, as well as U.S. patent application Ser. No. 13/463,020 titled Wireless Pairing System and Associated Methods and U.S. patent application Ser. No. 13/269,222 titled Wavelength Sensing Light Emitting Semiconductor and Associated Methods, the entire contents of each of which are incorporated herein by reference The luminaire 10 may be programmed to recognize a defined object and may not illuminate a target area upon detecting the defined object. Additionally, the luminaire may be programmed to modify its timing sequence when a defined object is sensed so that the lights may stay on longer or shorter than a predefined default setting as determined by the user for a particular object. A defined object may be any object that may be defined by a user as known to skilled artisans. A defined object may vary in size from a small rodents and vermin to larger animals such as deer and the like. A defined object may also include a vehicle. In an embodiment, the luminaire 10 may be equipped to identify indicia and accord significance to certain indicia on an object such as a license plate or name plate.

Various embodiments of the security light 10 according to the present invention contemplate that the sensor 18 may be provided by the camera 12, and that operation of the calibrating feature can be carried out based on sensing ambient light levels. For example, the sensor may be an ambient light sensor and may determine a level of ambient light in the environment where the security light is located. The ambient light sensor may generate data indicating the ambient light level, and communicate that data to a controller of the security light. The security light may also include a processor that processes a signal received from the ambient light sensor in order to carry out various functions based on the data received from the ambient light sensor.

In some embodiments of the security light 10 according to the present invention, the light source is movable between an on state and an off state based on the data received from the ambient light sensor. For example, it is preferable that the light source not be activated when the ambient light level is sensed to be high, i.e., during the day or when the lighting in the environment is suitable to light the area around the security light 10. Therefore, the controller may cause the light source to be positioned in the off state when the ambient light sensor senses an ambient light level above a threshold level. Similarly, the light source of the security light 10 according to an embodiment of the present invention may be positioned in the on state when the ambient light sensor senses an ambient light level below the threshold level. The brightness of the light emitted from the luminaire 10 may also be variable depending on the time of day and the size of the object detected in the target area.

Referring now to flowchart 70 of FIG. 12, an automatic method for ensuring that the luminaire 10 functions at minimal brightness is shown. Beginning at Block 72, the sensor 18 may check if the camera 12 is functioning properly (Block 74). If the camera 12 is not functioning properly, the brightness may be increased at Block 76, and the sensor 18 may check if the camera 12 is functioning properly again (Block 74). If the camera 12 is functioning properly at Block 74, then it may be determined whether the last operation was to increase luminaire 10 brightness. If the last operation was not to increase brightness, then the luminaire 10 may decrease brightness (Block 80) and the sensor 18 may check if the camera 12 is functioning properly again at Block 74. If the last operation was to increase brightness at Block 78, however, then an optional delay may occur (Block 82). A delay may prevent unnecessary checking of the brightness level and the functionality of the camera 12, wasting energy. It may then be determined whether a shutdown command was received at Block 84. If a shutdown command is not received, the sensor 18 may check for camera 12 functionality again at Block 74. If a shutdown command is received, the process may end at Block 86.

The method described in FIG. 12 may advantageously allow for the light source of the luminaire 10 to be dimmed to conserve power. The light source may, of course, be periodically checked to ensure that it is at its minimum effective brightness for the camera 12. Additionally, this process may be done automatically or by a user, as discussed above.

The security light 10 may additionally include a timekeeping device in communication with the controller to cause the light source 24 to turn on or off at certain times. This may advantageously prevent the light source 24 of the security light 10 from being used when it is not necessary, such as a bright day. Additionally, the time-keeping device may be used to determine when the security light 10 calibrates itself, facilitating the optional delay mentioned above.

Figure 17:
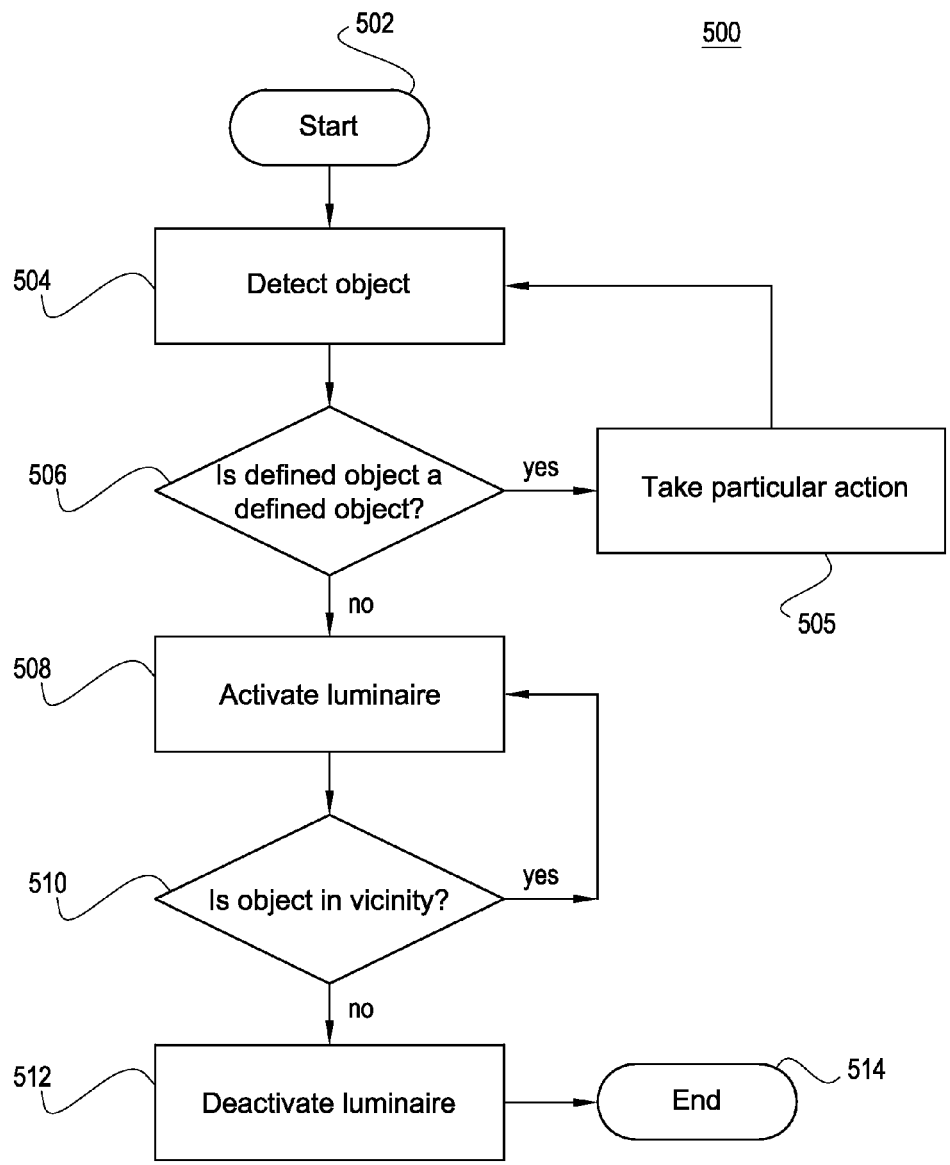
FIG. 17 is a flowchart demonstrating operation of the luminaire according to an embodiment of the present invention.

A method aspect of the present invention is illustrated in the flowchart 500 of FIG. 17 and may include illuminating a target area upon sensing an object using a luminaire. The luminaire, as described above, may include a wall mount, a driver circuit housing connected to the wall mount, a camera housing connected to the driver circuit housing, a light source housing connected to the camera housing, a light source array carried by the light source housing, the light source including a plurality of light sources, a prism carried by the light source housing adjacent the light source array, a heat sink in thermal communication with the light source array and carried by the light source housing, a camera carried by the camera housing, a sensor carried by the camera housing and a driver circuit carried by the driver circuit housing.

From the start (Block 502) the method may include defining parameters for a defined object and detecting an object (Block 504) to define a detected object. The method may further include determining (Block 506) if the detected object is a defined object. A defined object is preferably an object that a user may define to take a particular action. For example, a defined object may be a vehicle of a user. The user may then program the luminaire to take a particular action based on detection of the defined object. The particular action may be to do nothing, i.e., do not activate the luminaire. The particular action may, for example, be to illuminate the light source array of the luminaire for an amount of time. Alternatively, the particular action may be to illuminate the light source array at a particular brightness. The present invention also contemplates that the luminaire may be pre-programmed with various objects that are common to some environments. For example, it is contemplated that the luminaire may be programmed to detect certain wildlife such as, for example, deer, dogs, cats, moose, antelopes, buffalo, horses, possums, armadillos, and vermin in general. Accordingly, upon detection of such pre-programmed objects, the lighting device may take the particular action, which may be selected from the actions described above, or which may be any other action.

It is further contemplated that the luminaire according to embodiments of the present invention may include a timer connected to the controller. The timer may provide time data to the controller to operate the luminaire. For example, upon detection of an object that is a defined object, and upon cross-referencing various time data, the luminaire may activate to take an action selected from the actions described above. Further, it is contemplated that the luminaire, upon activation, may emit light at a particular brightness depending on a time of day.

If it is determined at Block 506 that the detected object is a defined object, then the particular action, described above, is taken at Block 505. Thereafter, the luminaire continues to detect an object at Block 504. If, however, it is determined at Block 506 that an object is detected, but that the detected object is not a defined object, then the luminaire is activated to emit light in the direction of the detected object at Block 508. The luminaire may be activated to emit light in the direction of the detected object in a number of ways. As described above, only certain light sources of the luminaire may be activated to direct light in the direction, or vicinity, of the detected object. Alternately, or in addition to, the light may be directed in the vicinity of the detected object by directional prisms of the optic. Additional information regarding directing the light emitted from the light source is provided above.

At Block 510, it is determined whether or not the detected object remains in the vicinity. The vicinity may be defined by a user, or maybe predefined within the luminaire. Further, those skilled in the art will appreciate that the vicinity is also referred to herein as the sensed area, and may be adjusted by the user as desired. If it is determined at Block 510 that the detected object means within the vicinity, and the luminaire remained activated at Block 508. If, however, it is determined at Block 510 that the detected object is no longer within the vicinity, then the luminaire is deactivated at Block 512. Thereafter, the method is ended at Block 514.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 15 illustrates a model computing device in the form of a computer 110, which is capable of performing one or more computer-implemented steps in practicing the method aspects of the present invention. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 110 may also include a cryptographic unit 125. Briefly, the cryptographic unit 125 has a calculation function that may be used to verify digital signatures, calculate hashes, digitally sign hash values, and encrypt or decrypt data. The cryptographic unit 125 may also have a protected memory for storing keys and other secret data. In other embodiments, the functions of the cryptographic unit may be instantiated in software and run via the operating system.

A computer 110 typically includes a variety of computer readable media. Computer readable media can be any available media that can be accessed by a computer 110 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 8 illustrates an operating system (OS) 134, application programs 135, other program modules 136, and program data 137.

The computer 110 may also include other removable/non-removable, volatile/nonvolatile computer storage media. By way of example only, FIG. 15 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives, and their associated computer storage media discussed above and illustrated in FIG. 15, provide storage of computer readable instructions, data structures, program modules and other data for the computer 110. In FIG. 15, for example, hard disk drive 141 is illustrated as storing an OS 144, application programs 145, other program modules 146, and program data 147. Note that these components can either be the same as or different from OS 134, application programs 135, other program modules 136, and program data 137. The OS 144, application programs 145, other program modules 146, and program data 147 are given different numbers here to illustrate that, at a minimum, they may be different copies. A user may enter commands and information into the computer 110 through input devices such as a keyboard 162 and cursor control device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 15. The logical connections depicted in FIG. 15 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 15 illustrates remote application programs 185 as residing on memory device 181.

The communications connections 170 and 172 allow the device to communicate with other devices. The communications connections 170 and 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 14:
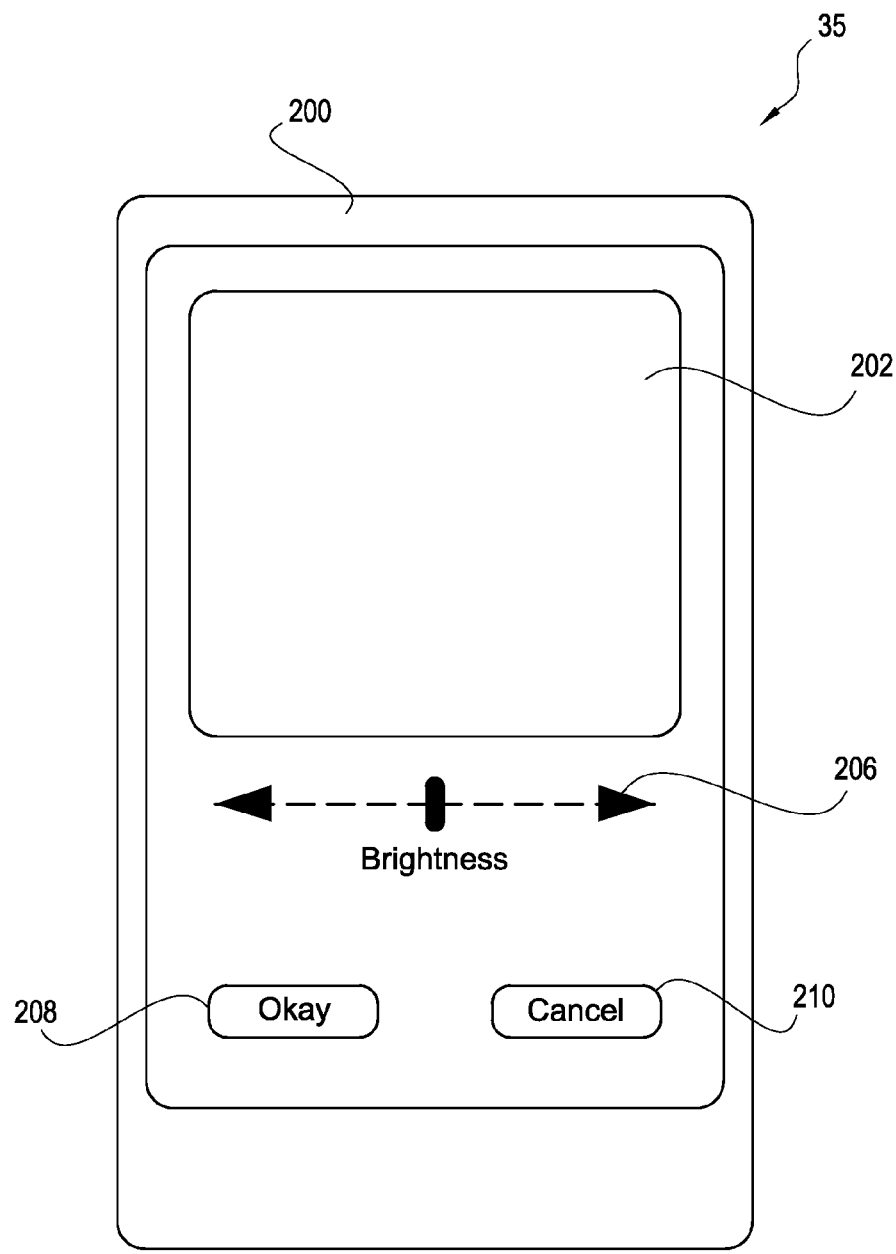
FIG. 14 is a schematic model of an exemplary user interface according to an embodiment of the present invention.

Referring now to FIG. 14, a model user interface 200 is shown in use on a remote device 35. The remote device 35 may advantageously be a mobile computing device, such as a smartphone or a laptop. The user interface 200 may include a camera feed 202 from the camera 12, which may demonstrate a brightness that is selected. A user may have the option to manually adjust brightness using slider 204, or automatically adjust brightness using button 206. Once the user is satisfied with the chosen brightness, the user may select the OK button 208 to save the adjustments, or the cancel button 210 to cancel the adjustments. This model user interface 200 is merely exemplary in nature, and is not intended to be limiting. Many other additional user interfaces 200 may readily come to mind of one skilled in the art having had the benefit of this disclosure, and are intended to be included herein. It is also contemplated that the user interface may be used to receive signals from the security light 10 indicating various conditions. For example, upon the occurrence of an event, it is contemplated that the security light 10 according to an embodiment of the present invention may send an alert to the user interface 200. Thereafter, it is contemplated that the user interface may be used to monitor the target area. Further, it is contemplated that the processor of the security light 10 may, in connection with the camera 12, capture images that occur surrounding the time of the event, and may stream those images to the user interface 200.

Many modifications and other embodiments of the invention will come to the mind of one skilled in the art having the benefit of the teachings presented in the foregoing descriptions and the associated drawings.

What is claimed is:

1. A luminaire comprising:
    a wall mount;
    a driver circuit housing connected to the wall mount;
    a camera housing connected to the driver circuit housing;
    a light source housing connected to the camera housing;
    a light source array carried by the light source housing, the light source array including a plurality of light sources;
    a plurality of prisms carried by the light source housing adjacent the light source array and arranged to direct light emitted by the light source array to different axial directions, respectively;
    a heat sink in thermal communication with the light source array and carried by the light source housing;
    a camera carried by the camera housing;
    a sensor carried by the camera housing; and
    a driver circuit carried by the driver circuit housing;
    wherein at least one of the camera and the sensor is configured to detect presence and vicinity of an object in a target area;
    wherein at least one of the light sources in the light source array is configured to emit light to illuminate the vicinity of the object sensed in the target area,
    wherein the light source array is operated to illuminate the target area; and
    wherein different ones of the light sources in the light source array corresponding to different ones of the prisms are selectively operated to illuminate different portions of the target area in a direction of the object sensed in the target area.

2. The luminaire according to claim 1 wherein the light sources are each a light-emitting diode (LED).

3. The luminaire according to claim 1 further comprising a controller wherein the sensor and camera generate data based on a sensed condition; and wherein the controller operates the light source array based upon the data and established parameters.

4. The luminaire according to claim 3 further comprising a time-keeping device in communication with the controller; and wherein time-keeping device is configured to generate timing data to operate the light source array based on the timing data.

5. The luminaire according to claim 3 further comprising a network connection in communication with the controller; wherein data is transmittable through the network connection; and wherein the light source array is operable responsive to the data transmitted through the network.

6. The luminaire according to claim 5 wherein the data is related to detection of an object in the target area; and wherein the data is transmitted upon detection of the object in the target area.

7. The luminaire according to claim 1 wherein the luminaire is programmable to recognize a defined object so as not to illuminate the target area upon detecting the defined object.

8. The luminaire according to claim 1 wherein brightness of the light emitted from the light source array is variable depending on at least one of the time of day, size of the object detected in the target area, and detection of a malfunction in at least one of the camera and the sensor.

9. The luminaire according to claim 1 wherein:
the light source housing comprises a first light source housing and a second light source housing;
the light source array comprises a first light source array including a plurality of light sources carried by the first light source housing and a second light source array including a plurality of light sources carried by the second light source housing;
the prisms comprise first prisms carried by the first light source housing adjacent the first light source array and second prisms carried by the second light source housing adjacent the second light source array;
the heat sink comprises a first heat sink in thermal communication with the first light source array and carried by the first light source housing a second heat sink in thermal communication with the second light source array and carried by the second light source housing;
the camera housing includes a first camera housing associated with the first light source housing and a second camera housing associated with the second light source housing;
wherein the camera includes a first camera carried by the first camera housing and a second camera carried by the second camera housing;
wherein the sensor includes a first sensor carried by the first camera housing and a second sensor carried by the second camera housing;
wherein the first and second cameras and the first and second sensors are configured to detect presence and vicinity of an object in a target area;
wherein the first and second light source arrays are positioned within the first and second light source housings respectively to minimize the overlap of the light emitted from each light source array.

10. A luminaire comprising:
a first wall mount;
a second wall mount;
a first light source housing connected to the first wall mount;
a second light source housing connected to the second wall mount;
a first light source array carried by the first light source housing, the first light source array including a plurality of light sources;
a second light source array carried by the second light source housing, the second light source array including a plurality of light sources;
first prisms carried by the first light source housing adjacent the first light source array and arranged to direct light emitted by the first light source array to different axial directions, respectively;
a second prism carried by the second light source housing adjacent the second light source array;
a first heat sink in thermal communication with the first light source array and carried by the first light source housing;
a second heat sink in thermal communication with the second light source array and carried by the second light source housing;
a first camera housing associated with the first light source housing;
a second camera housing associated with the second light source housing;
a first camera carried by the first camera housing;
a second camera carried by the second camera housing;
a first sensor carried by the first camera housing;
a second sensor carried by the second camera housing;
a controller in communication with the first and second camera and the first and second sensor;
wherein at least one of the first camera, second camera, first sensor and second sensor is configured to detect presence and vicinity of an object in a target area;
wherein at least one of the light sources in the plurality of light sources is configured to emit light to illuminate the vicinity of the object sensed in the target area;
wherein the first light source array and second light source array are operated to illuminate the target area;
wherein different ones of the light sources in the first light source array corresponding to different ones of the first prisms are selectively operated to illuminate different portions of the target area in a direction of the object sensed in the target area;
wherein the sensor and camera generate data based on a sensed condition; and
wherein the controller operates the light source array based upon the data and established parameters.

11. The luminaire according to claim 10 wherein the second prism is configured to direct the light emitted from the plurality of light sources in a direction of the object sensed in the target area.

12. The luminaire according to claim 10 wherein the light sources are each a light-emitting diode (LED).

13. The luminaire according to claim 10 wherein the light sources in the second light source array are configured to emit light in multiple directions so that upon sensing an object in the target area, a selected at least one light source is illuminable to emit light in the direction of the sensed object.

14. The luminaire according to claim 10 further comprising a time-keeping device in communication with the controller; and wherein the time-keeping device is configured to generate timing data to operate at least one of the first light source array and the second light source array based on the timing data.

15. The luminaire according to claim 10 further comprising a network interface configured to enable communication with a network;
wherein the controller is in communication with the network interface;

wherein the network interface is operable to receive communications across the network and provide an instruction to the controller; and wherein the controller operates at least one light source of the plurality of lighting devices responsive to the instruction received from the network interface.

16. The luminaire according to claim 15 wherein the data is related to detection of an object in the target area; and wherein the data is transmitted upon detection of the object in the target area.

17. The luminaire according to claim 1 wherein the luminaire is programmable to recognize a defined object so as not to illuminate the target area upon detecting the defined object.

18. The luminaire according to claim 10 wherein brightness of the light emitted from at least one of the first light source array is variable depending on at least one of the time of day, size of the object detected in the target area, and detection of a malfunction in at least one of the camera and the sensor.

19. The luminaire according to claim 10 wherein upon detection of an object in the target area, a selected at least one light source in the second light source array adjacent a selected prism section is illuminated to emit light in the direction of the object sensed in the target area.

* * * * *